(12) United States Patent
Fukazawa et al.

(10) Patent No.: US 7,428,090 B2
(45) Date of Patent: Sep. 23, 2008

(54) ELECTROCHROMIC ELEMENT

(75) Inventors: Akihiko Fukazawa, Fujieda (JP);
Chihiro Minami, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 295 days.

(21) Appl. No.: 10/734,291

(22) Filed: Dec. 15, 2003

(65) Prior Publication Data

US 2005/0248824 A1 Nov. 10, 2005

(30) Foreign Application Priority Data

Dec. 24, 2002 (JP) ............................. 2002-372054

(51) Int. Cl.
*G02F 1/15* (2006.01)
*G02F 1/153* (2006.01)

(52) U.S. Cl. ................... 359/265; 359/270; 359/273; 359/274; 359/267

(58) Field of Classification Search ................. 359/265, 359/270, 273, 274, 267
See application file for complete search history.

(56) References Cited

U.S. PATENT DOCUMENTS

| 5,831,760 | A | 11/1998 | Hashimoto et al. |
| 6,211,995 | B1 | 4/2001 | Azens et al. |
| 6,791,737 | B2 * | 9/2004 | Giron ..................... 359/265 |
| 2001/0031403 | A1 | 10/2001 | Giron |

FOREIGN PATENT DOCUMENTS

| EP | 0 730 189 A1 | 9/1996 |
| JP | 9-152634 | 6/1997 |
| WO | WO 00/03290 | 1/2000 |

OTHER PUBLICATIONS

J. Göttsche, et al., Solar Energy Materials and Solar Cells, vol. 31, No. 3, pp. 415-428, XP-000417752, "Electrochromic Mixed $WO_3$-$TIO_2$ Thin Films Produced By Sputtering and the Sol-Gel Technique: A Comparison", Dec. 1, 1993.

L. Kullman, et al., "Electrochromic Devices Incorporating Cr Oxide and Ni Oxide Films: Comparison", Solar Energy, vol. 68, No. 6, XP-004198076, 2000, pp. 517-522.

* cited by examiner

*Primary Examiner*—Ricky Mack
*Assistant Examiner*—Jack Dinh
(74) *Attorney, Agent, or Firm*—Oblon, Spivak, McClelland, Maier & Neustadt, P.C.

(57) ABSTRACT

Deterioration of characteristics due to repeated cycles of coloration and discoloration in an electrochromic element comprising an oxidative coloration layer composed of a nickel oxide and a electrolyte composed of a solid electrolyte is suppressed. A lower ITO transparent electrode film 12 is formed on a transparent substrate 10. A nickel oxide film 32 making up an oxidative coloration layer, an intermediate layer 33, a tantalum oxide film making up a solid electrolyte layer, a mixed film comprising a tungsten oxide and a titanium oxide making up a reductive coloration layer, and an upper ITO transparent electrode film 20 making up an upper electrode film are formed on the lower ITO transparent electrode film 12 on this order. The intermediate layer 33 is a transparent film comprising a metal oxide such as $SnO_2$, a metal such as Al, or a composite of the metal oxide and the metal.

28 Claims, 15 Drawing Sheets

SPECTRAL OF PRESENT SAMPLE A (HAVING INTERMEDIATE LAYER OF Al)

RESPONSE CHARACTERISTICS OF PRESENT SAMPLE B AND COMPARATIVE SAMPLE a

RESPONSE CHARACTERISTICS OF PRESENT SAMPLE A (SnO2 INTERMEDIATE LAYER) AND PRESENT SAMPLE B (Al INTERMEDIATE LAYER)

ELECTROCHROMIC ELEMENT

BACKGROUND ARTS

1. Field of the Invention

The present invention relates to an electrochromic (herein after simply referred to as "EC") element, comprising an oxidative coloration layer composed of an nickel oxide and an electrolyte layer composed of a solid electrolyte. More, specifically, the invention relates to an EC element whose deterioration of characteristics due to repeated cycles of coloration and discoloration can be suppressed.

2. Description of Related Arts

An EC element is an element which utilizes an EC phenomenon to reversibly carry out coloration and discoloration, and the EC element has been used in an anti-glare mirror, a dimming glass, a display elements and the like. FIG. 2 shows an example of a laminated cross-section of a conventional EC element. In this element, the whole of the element is made transparent. On a transparent glass substrate 10, an ITO (Indium Tin Oxide) transparent electrode film 12 making up a lower electrode film, a mixed film 14 comprising an iridium oxide and a tin oxide making up an oxidative coloration layer and a tantalum oxide film 16 making up a solid electrolyte film, a tungsten oxide film 20 making up a reductive coloring film and an ITO transparent electrode film 20 making up an upper electrode film are formed thereon on this order. A parting line 22 is previously formed on one edge of the lower ITO transparent electrode film 12 by a laser etching process, so that an area 12a of the edge portion is electrically partitioned. One edge of the upper ITO transparent electrode film 20 is electrically connected to the separated area 12a of the lower ITO transparent electrode transparent film 12. Clip electrodes 24 and 26 for tapping an electrode are provided on both edge of the substrate 10. The clip electrode 24 is electrically connected to the lower ITO transparent electrode film 12, and the clip electrode 26 is electrically connected to the upper ITO transparent electrode film 20. A transparent sealing resin 28 is applied onto the upper ITO transparent electrode film 20, whereon a transparent glass serving as a transparent sealing member 30 is adhered to seal the whole of the laminated films. According to the configuration just mentioned, taking the clip electrode 24 as a positive pole and the clip electrode as negative pole and applying a voltage, both the oxidative coloration layer 14 and the reductive coloration layer 18 are colored. On the other hand, applying a reverse voltage (or making a shortage circuit), both coloration layers 14 and 18 are discolored.

Both the mixed film 14 comprising an iridium oxide and a tin oxide, and the tungsten oxide film 18 in the conventional EC element are blue colored, and at the time of coloring, the whole of the element is blue colored. For this reason, the conventional EC element cannot be used for an application in which a color should be seriously taken (i.e., an application where a hue of an image obtained through the element should not be changed). For example, a presently existing digital camera has a built-in ND (natural density) filter, and is configured so that when an amount of an incident light is large, the ND filter is driven by a motor to move toward a front side of an imaging element such as CCD (charge coupled device) to be darkened. If the ND element could be substituted by an EC elements which can darken, then the driving by a motor is not required. This can miniaturize a digital camera and can save an electric power. However, since the conventional EC element colors blue, which leads to bluish image being taken, and which makes it difficult to control white balance, the conventional EC element cannot be used instead of the ND filter.

In light of the above situations, we have suggested an EC element which realizes a gray color at the time of the coloration as Japanese Patent Application Number 2002-251856, which has not yet been published. Referring to drawings, this technique will be described. FIG. 3 shows an EC element disclosed therein. The parts common to those of FIG. 2 are assigned to the same symbols. An ITO transparent electrode film 12 making up a lower electrode film is formed on a transparent glass substrate 10, a nickel oxide film 32 making up an oxidative coloration layer, a tantalum oxide film 16 making up a solid electrolyte layer, a mixed film 34 comprising tungsten oxide and titanium oxide making up a reductive coloration layer, an ITO transparent electrode film 20 making up an upper electrode film are formed on this order. A parting line 22 is previously formed on one edge of the lower ITO transparent electrode film 12 by a laser etching process, so that an area 12a of the edge portion is electrically partitioned. One edge of the upper ITO transparent electrode film 20 is electrically connected to the separated area 12a of the lower ITO transparent electrode film 12. Clip electrodes 24 and 26 for tapping an electrode are provided on both edge of the substrate 10. The clip electrode 24 is electrically connected to the lower ITO transparent electrode film 12, and the clip electrode 26 is electrically connected to the upper ITO transparent electrode film 20. A transparent liquid sealing resin 28 is applied onto the upper ITO transparent electrode film 20, whereon a transparent glass serving as a transparent sealing member 30 is cured to seal the whole of the laminated films. According to the configuration just mentioned, the EC layer shown in FIG. 3 is made transparent in the thickness direction thereof.

According to the configuration shown in FIG. 3, taking the clip electrode 24 as a positive pole and the clip electrode as negative pole and applying a voltage, both the oxidative coloration layer 32 and the reductive coloration layer 34 are colored. On the other hand, applying a reverse voltage (or making a shortage circuit), both coloration layers 32 and 34 are discolored. The chemical reactions at the time of the coloration and discoloration are, for example, represented as follows:

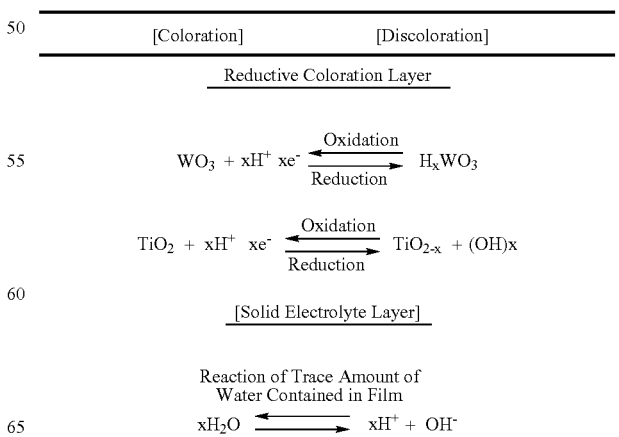

-continued

[Coloration]　　　　　[Discoloration]

[Oxidative Coloration Layer]

$$NiO + OH^- \underset{\text{Oxidation}}{\overset{\text{Reduction}}{\rightleftarrows}} NiOOH + H^+ + e^-$$

$$Ni(OH)_2 \underset{\text{Oxidation}}{\overset{\text{Reduction}}{\rightleftarrows}} NiOOH + H^+ + e^-$$

$$Ni(OH)_2 + OH^- \underset{\text{Oxidation}}{\overset{\text{Reduction}}{\rightleftarrows}} NiOOH + H_2O + e^-$$

The productions stages for producing the EC element shown in FIG. 3 will be described as follows:

(1) A transparent glass substrate 10 on which an ITO transparent electrode film 12 is formed is prepared, and it is cut into a desired shape. Alternatively, a transparent glass substrate 10 having being cut into a desired shape is prepared, and an ITO transparent electrode film 12 is formed thereon.

(2) A parting line 22 is formed by laser-etching the transparent glass substrate 10.

(3) The substrate 10 is accommodated within a vacuum chamber of a vacuum deposition apparatus, a nickel oxide film 32 is formed on the substrate 10 by a vacuum deposition process utilizing NiO or Ni as a depositing material (starting material) When Ni is used as the depositing material, the deposited Ni is compounded to oxygen within the vacuum chamber to form a nickel oxide.

(4) Subsequently, a tantalum oxide film 16 is formed by a vacuum deposition process (precisely, an ion-plating process in which a high frequency is applied) utilizing $Ta_2O_5$ as a depositing material.

(5) Subsequently, by a two-element vacuum deposition process utilizing $WO_3$ and $TiO_2$, respectively, a mixed film 34 comprising tungsten oxide and titanium oxide is formed. An example of the arrangement of elements within the vacuum deposition apparatus at the time of carrying out this two-element vacuum deposition is shown in FIG. 4. A plurality of substrates 10 onto which the tantalum oxide 16 is formed are held in the state each surface subjected to the film formation is faced downwardly on a lower surface of a rotating substrate holder 11. Crucibles 13 and 15 are provided under the substrate holder 11. $WO_3$ is accommodated within the crucible 13 as a depositing material 17. $TiO_2$ is accommodated within the crucible 15 as a depositing material 19. Electron beams 21 and 23 are applied to the depositing materials 17 and 19, respectively to heat and volatilize the depositing materials 17 and 19. The volatilized depositing materials 17 and 19 go upwardly, are mixed, and then deposited on the substrate 10 to thereby form the mixed film 34 comprising tungsten oxide and titanium oxide. In inclined upper directions of the crucibles 13 and 15, quartz oscillators 25, and 27 are placed respectively. By a change in the frequency of the quartz oscillator 25, the deposition rate of the depositing material 17 is monitored. By a change in the frequency of the quartz oscillator 27, the deposition rate of the depositing material 19 is monitored. By controlling the outputs of the electron beams 21 and 23 depending upon the deposition rates of the depositing materials 17 and 19, which are monitored, a mixing ratio of tungsten oxide to titanium oxide in the mixed film 34 in a predetermined value. The series of the film formation stages (3) to (5) can be continuously carried out by switching the deposition sources and film formation conditions step by step while holding the substrate 10 on the substrate holder 11 without taking the substrate 10 out of the chamber.

(6) For a time, the substrate 10 is taken out of the vacuum chamber, a mask pattern is changed, and then the substrate 10 is again accommodated within the vacuum chamber, after which an upper ITO transparent electrode film 20 is formed by a vacuum deposition process (precisely, an ion-plating process in which a high frequency is applied) utilizing ITO as a depositing material. Amongst the film production processes (3) to (6), the formation of the tantalum oxide film 16 is carried out by an ion-plating process in which a high frequency of 600 W is applied in process (4), while the formation of the upper ITO transparent electrode film 20 is carried out by an ion-plating process in which a high frequency of 400 W is applied in process (6). The stages (3) and (4) are carried out without application of a high frequency. It is noted that the formation of the nickel oxide film 32 is carried out by an ion-plating process in which a high frequency is carried out, an originally colored nickel oxide film is formed. However, after the completion of the EC element, when a discoloration voltage is applied, the film is perfectly discolored and possessed characteristics similar to those produced without application of any high frequency. This indicates that the formation of the nickel oxide film 32 in stage (3) can be carried out with application of a high frequency.

(7) After the completion of film formation stages, the substrate 10 is taken out of the vacuum chamber, and clip electrodes 24 and 26 are provided.

(8) A transparent liquid sealing resin 28 is applied and a transparent glass as a sealing member 30 is adhered, and then the liquid sealing resin 28 is cured to complete the EC element.

The characteristics of the EC element measured, which is shown in FIG. 3, produced as described above will be described. In the measurement, approximately 4 cm square sample is used. The thickness of ITO transparent electrode film 12 is approximately 250 nm, that of the nickel oxide film 32 is approximately 100 nm, that of tantalum oxide film 16 is approximately 600 nm, a mixed film 34 comprising tungsten oxide and titanium oxide is approximately 500 nm, and that of ITO transparent electrode film 12 is approximately 250 nm. The film formation conditions of the nickel oxide film 32, the tantalum oxide film 16, a mixed film 34 comprising tungsten oxide and titanium oxide are as follows: The nickel oxide film 32 is formed by utilizing NiO having a purity of not less than 99.9% as a depositing material at a substrate temperature of 120° C. under an oxygen pressure of $3\times10^{-4}$ Torr at a film formation rate of 0.5 nm/second. The tantalum oxide film 16 is formed by utilizing $Ta_2O_5$ having a purity of not less than 99.9% as a depositing material at a substrate temperature of 120° C. under an oxygen pressure of $3\times10^{-4}$ Torr at a film formation rate of 0.67 nm/second. The mixed layer 34 comprising tungsten oxide and titanium oxide is formed by utilizing $WO_3$ and $TiO_2$ each having a purity of not less than 99.9% as depositing materials at a substrate temperature of 120° C. under an oxygen pressure of $1.6\times10^{-4}$ Torr. The ratio of the deposition rate of $WO_3$ to that of $TiO_2$ is set depending upon the mixing ratio of the tungsten oxide and titanium oxide intended in the mixed film 34. For example, when the proportion of titanium atom (atomic %) in the mixed film 34 comprising a tungsten oxide and a titanium oxide relative to the total atomic number of tungsten atoms and titanium atoms is W:Ti=72:28, the ratio of volatilizing rates of $WO_3$ to $TiO_2$ (the ratio of increasing film thicknesses measured by the quarts oscillators 25 and 27) is set to be approximately 3:2.

The resulting nickel oxide film 32 is crystal (polycrystal). The resulting mixed film 34 comprising a tungsten oxide and a titanium oxide is amorphous. There is a possibility that in the course of depositing NiO, part of NiO is changed to nickel oxides [Ni(OH)$_2$, Ni$_2$O$_3$, NiOOH and the like], but in any case, the NiO may be considered to be the main component in the nickel oxide film 32. Similarly, although there is a possibility that part of WO$_3$ is chaned to other tungsten oxides and part of TiO$_2$ is changed to other titanium oxides in the course of the two-element deposition stage, in any case, the mixed film 34 comprising a tungsten oxide and a titanium oxide may be considered to comprise a mixture of WO$_3$ to TiO$_2$ as main components. It is considered that the nickel oxide film 32 may exhibit an EC phenomenon even if it is in a crystalline, fine-crystalline or amorphous state. The mixed film 34 comprising a tungsten oxide and a titanium oxide is considered to be desirably amorphous, since efficiencies of coloration and discoloration are decreased when it is crystallized.

FIG. 5 shows spectral transmittance characteristics in the case where the mixing ratio of the tungsten oxide and the titanium oxide in the reductive coloration layer 34 in the EC element shown in FIG. 3 is varied. The value for the proportion of Ti (atomic %) is shown as the proportion of titanium atom (atomic %) in the mixed film 34 comprising a tungsten oxide and a titanium oxide relative to the total atomic number of tungsten atoms and titanium atoms determined by photoelectron spectroscopy (ESCA). In the measurement of FIG. 5, at the time of coloration, the applied voltage is 20 V, and the characteristics after the application for 90 seconds are measured. At the time of discoloration, the discoloration voltage is −2.0 V, and the characteristics after the application for 90 seconds are measured. According to FIG. 5, it has been proven that the spectral characteristics, particularly those at a long wavelength side are changed depending upon the mixing ratio of the tungsten oxide to the titanium oxide; as TiO$_2$ is lower, the level at a long wavelength side is down, exhibiting a bluish color; and as TiO$_2$ becomes higher, the level at a long wavelength side is up, decreasing a bluish color. Also, when the proportion of titanium atom is within the range of from 5 to 40 atomic % (i.e., the atomic ratio of W to Ti=95:5 to 60:40), the mixed layer 34 had a gray color. Particularly, when the proportion of titanium atom is within the rage of from 20 to 3-atomic % (i.e., the atomic ratio of W to Ti=80:20 to 70:30), the spectral characteristics at the visible region (400-80 nm) becomes nearly flat, a substantially pure gray color is obtained. It is noted that there is little differences in the spectral characteristics depending upon the mixing ratio of TiO$_2$ at the time of the discoloration. In this case, transmittances at a human's view peak position (wavelength at 550 nm) are 80% or more (average transmittance at the total of the visible wavelength region is approximately 80%), obtaining colorless and substantially transparent color.

Next, this EC element will be described by referring to FIG. 6. FIG. 6 shows spectral transmittance characteristics in the case where the coloration voltage is varied and the discoloration voltage is applied in the EC element shown in FIG. 3. In the measurement in FIG. 6, the atomic proportion of titanium contained in the mixed film 34 comprising a tungsten oxide and a titanium oxide is 28 atomic % (atomic ratio of W:Ti=72:28). At the time of coloration, the characteristics are measured after a coloration voltage is applied for 90 seconds. At the time of discoloration, the characteristics are measured after a discoloration voltage, which is −1.5 V, is applied for 90 seconds. According to FIG. 6, it has been proven that at the time of the coloration, the transmittance becomes lower as the coloration voltage is higher, and the characteristics become flat at the visible region, lowering a bluish color. Furthermore, when the coloration voltage becomes higher than 1.75 V, the EC element is colored in a concentrated manner. Particularly, at the coloration voltage not less than 2 V, the transmittance is decreased near 10% or less over substantially entire visible region, the characteristics are much more flatten, obtaining substantially pure gray color. Consequently, the peak value of the applied voltage at the time of the coloration is preferably not less than 1.75V, more preferably not less than 2.0 V and not more than voltage resistance. The voltage at the time of the discoloration is also relatively flat at the visible region, and a colorless and substantially transparent color is obtained. The transmittance at the time of the discoloration is obtained 80% or more at the human's visible peak region.

According our experiments thereafter, it has been understood that the peak value of the applied voltage at the time of the coloration is desirably not more than 3 V. Specifically, at the applied voltage of not less than 3 V, the durability against repeatedly carrying out coloration and discoloration cycles is decreased. The example described above is the case of a transmissive element where ITO transparent electrode films are used as both electrodes (an EC element made transparent in the thickness direction thereof). In contrast, in the case of an reflecting element (EC element configured as a mirror) where an ITO electrode is used as one electrode and a reflecting film also serving as an electrode is used as the other electrode, the peak value of the applied voltage at the time of the coloration is desirably lower than that in the case of the transmissive electrode. Specifically, in the case of the reflecting element having a reflecting film also serving as an electrode formed, when the applied voltage at the time of the coloration is +2 V, it is destroyed after several ten cycles of the coloration and discoloration. Although the reason has not yet been known, since the reflecting film also serving as an electrode (Al film) has a lower electric resistance in comparison with that of the ITO transparent electrode film, it is deduced as one cause that the voltage applied to the EC element itself becomes high. According to our experiments, in the case of the reflecting element utilizing the reflecting film also serving as an electrode (Al film), it has been proven that the peak value of the applied voltage at the time of the coloration is desirably not less than 1 V and not more than 1.8 V.

Next, this EC element will be described by referring to FIG. 7. FIG. 7 shows characteristics for response speed at a time of the coloration in the case where the coloration voltage is varied in the EC element. In the measurement in FIG. 7, the atomic proportion of titanium contained in the mixed film 34 comprising a tungsten oxide and a titanium oxide is 28 atomic %. The transmittances is measured at a human's view peak position (wavelength at 550 nm). According to FIG. 7, the characteristics for response speed depends upon the area of the element, and as the element area is lower, the response becomes quicker, while as the element area is higher, the response becomes slower. In the case of utilizing the EC element as an element for regulating camera's exposure, the element area may be a relatively small and, if the coloration voltage is not less than 1.75 V, the coloration is arrived to a concentrated color at relatively instance.

Next, differences between the EC element of FIG. 3 and the conventional EC element of FIG. 2 in spectral transmittance characteristics are shown in FIG. 8. In the measurement in FIG. 8, the atomic proportion of titanium contained in the mixed film 34 comprising a tungsten oxide and a titanium oxide is 28 atomic % The coloration voltage is 2.0 V for the EC element of FIG. 3 and 1.5 V for the conventional EC element of FIG. 2, and the applied period is 30 second for both EC elements. The discoloration voltage is −1.5 V and the applied period is 30 seconds for both EC elements. According to FIG. 8, for the transmitting color at the time of the coloration, the conventional EC element of FIG. 2 is strongly bluish, while the EC element of FIG. 3 has flat characteristics at the visible region, obtaining a gray color. As for the transmitting color at the time of the discoloration, while the conventional EC element of FIG. 2, which has a high level around yellow color, becomes a yellowish color, the EC element of FIG. 3 becomes colorless and substantially transparent. The EC element of FIG. 3 has a transmittance at the coloration of approximately 20% over a substantially entire region, and a transmittance at the discoloration of approximately 80% at the peak position of the human visibility. The value of the transmittance, which is 80%, is high in comparison with that of the conventional EC element of FIG. 2, and it looks a high transparency in comparison with the conventional EC element of FIG. 2.

It is noted that no gray color can be obtained at the time of the coloration, only when the material of the oxidative coloration layer 14 is changed to the nickel oxide (comprising NiO as a main component) in the conventional configuration shown in FIG. 2. Also, no gray color can be obtained at the time of the coloration, only when the material of the reductive coloration layer 18 is changed to a mixture of tungsten oxide with titanium oxide (comprising $WO_3$ and $TiO_2$ as main components) A gray color at the time of the coloration can obtained for the first time when the material of the oxidative coloration layer 14 is changed to the nickel oxide (comprising NiO as a main component) and the material of the reductive coloration layer 18 is changed to a mixture of tungsten oxide with titanium oxide (comprising $WO_3$ and $TiO_2$ as main components).

As described above, the EC element of FIG. 3 which gives a transparent color at the time of the coloration and which gives a colorless and substantially transparent color at the time of the discoloration is suitable for the application where the change in the hue in the resulting image obtained-through the EC element is not desired. FIG. 9 schematically shows an example of the arrangement of main portions of an optic system in the case where the EC element of FIG. 3 is used in a digital camera (steel camera, video camera or such). On an optical axis from a lens 36 to an imaging element 42 such as CCD, a mechanical diaphragm 38 driven by a motor and an ND filter comprising the EC element shown in FIG. 3 are arranged on this order. The ND filter 40 comprising an EC element is arranged in a fixed manner. When a luminescence of a subject measured by a photometric element, which is separately provided, is within a prescribed value, the NF filter 40 comprising an EC element is discolored. The average transmittance of a visible light possessed by the ND filter 40 comprising an EC element is approximately 80% at the time of the discoloration and, thus, there is no case for lacking exposure. Also, since the transmitting color is colorless and substantially transparent, the image taken does not become bluish, and a white balance can easily be controlled. When the luminescence of a subject becomes larger than a prescribed value and, when no exposure cannot be adequately adjust at F 38, a prescribed coloration voltage (for example, 2.0 V) is applied to the ND filter comprising an EC element to make the ND filter 40 in a coloration state, and to be darkened. At the time of the coloration, the average transmittance of a visible light possessed by the ND filter 40 comprising an EC element is approximately 20%, which can sufficiently decrease a light. Since the transmitting color is gray, good color reproductivity can be obtained, and the image taken does not become bluish. Thereafter, if the luminance of the subject is decreased to be not higher than the prescribed value, a prescribed discoloration voltage is applied to the ND filter 40 comprising an EC element (or both electrodes are shorted) to be in a discoloration state. As described above, by substituting the conventional motor-driven ND filter with the ND filter 40 comprising an EC element, a mechanical configuration becomes simple, making it possible to miniaturize a camera, enhancing a design, and reducing a weight. Also, since driving by a motor is not required, an electric power can be saved. Also, the ND filter 40 comprising an EC element requires no attachment and detachment, operation of attachment and detachment can be avoided. The ND filter 40 comprising an EC element can also be accommodated within a single lens reflex camera. Since the the ND filter 40 comprising an EC element is all solid type, even if it is destroyed, there is no problem in terns of leakage of a liquid or such.

Whereas the example described above is that the adjustment of the coloring amount possessed by the ND filter 40 comprising an EC element is one stage (ON/OFF) switching manner, it may be two or more switching manner or no switching manner by adjusting the coloration voltage to adjust the coloring amount in two or more stages or no stage (the peak value of the coloration voltage is se to be, e.g., 1.75 V or more, more preferably 2 V or more and 3 V or less). In the case of the configuration just mentioned, the ND filter 40 comprising an EC element can also serve as diaphragm and the mechanical diaphragm 38 may be omitted, making the mechanical configuration much more simple.

The EC element of FIG. 3 may not only be used in a digital camera, but also in an exposure adjusting element for a film type camera. Also, the EC element of FIG. 3 may be used in sunglasses, a dimmer glass, sunroof and the like.

According our studies thereafter, it has been proven that the EC element disclosed in Japanese Patent Application No. 2002-251856 deteriorates the response in a relatively early stage when the cycles of coloration and discoloration are repeated. Although it has not yet been known that what type of chemical reaction leads to the deterioration in the characteristics due to the repeated cycles of the coloration and discoloration, it may be considered that some types of deterioration occur on an interface between the nickel oxide and the solid electrolyte or between the nickel oxide and the solid electrolyte.

The present invention is made in light of the above situations, and an object of the present invention is to enhance durability of the EC element comprising the oxidative coloration layer composed of an nickel oxide and the electrolyte composed of a solid electrolyte against repeated cycles of coloration and discoloration.

SUMMARY OF THE INVENTION

The present invention is to enhance durability of the EC element disclosed in Japanese Patent Application No. 2002-251856 against repeated cycles of coloration and discoloration.

Specifically, the present invention is an EC element having a configuration that a reductive coloration layer and an oxidative coloration layer are arranged in a facing manner between which a solid electrolyte layer is intervened; wherein said reductive coloration layer is composed of a material containing a tungsten oxide and a titanium oxide; wherein said oxidative coloration layer is composed of a material containing a nickel oxide; wherein a transparent intermediate layer composed of a metal oxide other than a nickel oxide or a metal or a composite (a laminate of the metal oxide other than the nickel oxide and the metal, a mixture or such) comprising a metal oxide other than the nickel oxide and a metal as a main component is placed between said oxidative coloration layer and said solid electrolyte layer, and wherein said electrochromic element has a gray color at the time of coloration (the term "gray color" intended herein include a pure gray color whose spectral characteristic is substantially flat at the visible region and also include a color which is recognized by a gray color by human eyes). According to the present invention, the reductive coloration layer is composed of a material containing a tungsten oxide and a titanium oxide and the oxidative coloration layer is composed of a material containing a nickel oxide, whereby a gray color is obtained at the time of coloration. Also, a colorless and transparent color can easily be obtained at the time of discoloration. The term "colorless" intended herein include pure colorless whose spectral characteristic is substantially flat at the visible region and also include a color which is recognized by colorless color by human eyes. By placing the intermediate layer, the durability against repeatedly carrying out coloration and discoloration can be enhanced in comparison with the case of placing no intermediate layer. This is probably due to prevention of direct exchange between the oxidative coloration layer and the solid electrolyte layer.

The present invention is an EC element comprising a first electrode layer, a reductive coloration layer, a solid electrolyte layer, an oxidative coloration layer, and a second electrode layer laminated between two plate materials, and at least combination of a plate material at one side with the electrode layer of said two plate materials and said two electrode layers being made transparent; wherein said reductive coloration layer is composed of a material containing a tungsten oxide and a titanium oxide; wherein said oxidative coloration layer is composed of a material containing a nickel oxide; wherein a transparent intermediate layer composed of a metal oxide other than a nickel oxide or a metal or a composite comprising a metal oxide other than the nickel oxide and a metal as a main component is placed between said oxidative coloration layer and said solid electrolyte layer, and wherein said electrochromic element has a gray color at the time of coloration. In this EC element, for example, both of the two plate materials and the two electrode layers are made transparent, the total of said element is made transparent in the thickness direction thereof; whereby the EC element may be constituted as an element for adjusting exposure placed on an optical axis of the imaging element of a digital camera. Also, in the EC element, one combination of a plate material at one side with the electrode layer of the two plate materials and the two electrode layers is made transparent, and the electrode layer at the other side is made of a reflecting metal film to make up a reflectance-variable mirror.

The present invention is an EC element having a substrate, a first electrode layer formed on said substrate in a fixed manner, an oxidative or reductive coloration layer formed on said first electrode layer in a fixed manner, a solid electrolyte layer formed on said oxidative or reductive coloration layer in a fixed manner, a reductive or oxidative coloration layer formed on said solid electrolyte layer in a fixed manner, and a second electrode layer formed on said reductive or oxidative coloration layer in a fixed manner, at least one of said first and second electrode layers being made transparent, wherein said reductive coloration layer is composed of a material containing a tungsten oxide and a titanium oxide; wherein said oxidative coloration layer is composed of a material containing a nickel oxide; wherein a transparent intermediate layer composed of a metal oxide other than a nickel oxide or a metal or a composite comprising a metal oxide other than the nickel oxide and a metal as a main component is placed between said oxidative coloration layer and said solid electrolyte layer, and wherein said electrochromic element has a gray color at the time of coloration. According to this configuration, a total solid type EC element having an enhanced durability against repeated cycles of coloration and discoloration can be configured. When being composed of an inorganic material, the solid electrolyte layer may be composed, for example, of $Ta_2O_5$ as a main component. The total solid EC element can be applied to various applications such as described herein below.

(a) Dimming Element:

The substrate is made transparent, the first and second electrode layer are each composed of a transparent electrode film such as ITO, a transparent plate-form sealing member is conjugated with the second electrode layer via a transparent sealing resin, the total of the element is made transparent in the thickness direction thereof., and the element is placed on an optical axis of an imaging element of a digital camera as an element for adjusting exposure. This can makeup a dimming element (transmittance-variable element) which has a gray color at the time of coloration. The dimming element can be used to make up, for example, an element for adjusting exposure for a camera (such as ND filter and diaphragm), sunglasses, dimming glass, and sunroof). In any case, the strength of light can be adjusted without changing the color of transmitting light.

(b) Reflectance-Variable Mirror:

The substrate is made of a transparent plate form material such as a transparent glass, the first electrode layer is composed of a transparent electrode film such as ITO film, the second electrode layer is composed of a reflecting metal film, and a sealing member is conjugated with the second electrode layer via a sealing resin. This makes up a reflectance-variable mirror whose front side is at the side of said substrate, and which has a gray color at the time of coloration.

Alternatively, the first electrode layer is composed of a reflecting metal film, and the second electrode layer is composed of a transparent electrode film such as ITO film, and a sealing member is conjugated with the second electrode layer via a transparent sealing resin. This makes up a reflectance-variable mirror whose front side is at the side of said transparent sealing member, and which has a gray color at the time of coloration.

(c) Display Element:

The substrate is made of a transparent plate-form member such as a transparent glass, the first and second electrode layer are each composed of a transparent electrode film such as ITO, an opaque background member such as a white glass is conjugated with the second electrode layer via a transparent sealing resin. This makes up a display element whose front side is at the side of the substrate, and which has a gray color at the time of coloration.

Alternatively, the substrate is made of an opaque background member such as a white glass, the first and second electrode layer are each composed of a transparent electrode film such as ITO, and a transparent plate-form sealing member such as a transparent glass is conjugated with the second electrode layer via a transparent sealing resin. This makes up a display element whose front side is at the side of the transparent plate-form sealing member, and which has a gray color at the time of coloration.

The present invention is not restricted to the EC element disclosed in Japanese Patent Application No. 2002-251856, and is widely applicable to various EC element having an oxidative coloration layer composed of a nickel oxide and an electrolyte composed of a solid electrolyte, which EC elements are not restricted to those which have a gray color at the time of coloration. Specifically, the present invention relates to an EC element comprising a transparent intermediate layer composed of a metal oxide other than a nickel oxide or a metal or a composite comprising a metal oxide other than the nickel oxide and a metal as a main component is placed between an oxidative coloration layer containing a nickel oxide and a solid electrolyte layer., said metal oxide making up said intermediate layer contains no nickel oxide or if any contains in an amount of less than 0.02, preferably less than 0.01, on the weight base relative to the main component making up said intermediate layer. According to this configuration, the durability against repeatedly carrying out coloration and discoloration can be enhanced in comparison with the case of placing no intermediate layer.

As a prior art of the EC element, which places an intermediate layer between an oxidative coloration layer and a solid electrolyte layer to enhance durability against repeatedly carrying out coloration and discoloration, Japanese Patent Laid-Open No. 9-152634 can be mentioned. In this publication, an intermediate layer is composed of "a layer comprising an oxidative coloring electrochromic substance and a metal oxide". According to the publication, the weight ratio of the oxidative coloring electrochromic substance to the metal oxide (the oxidative coloring electrochromic substance/the metal oxide) is preferably not more than 0.02 and not less than 0.02. It is disclosed that if the weight ratio is greater than 1, absorbency is unduly large, whereas the weight ratio is less than 0.02, a coloring rate becomes slow and durability is change for the worse. According to our experiments, as described fully later on, in the case are the oxidative coloration layer is composed of a material containing a nickel oxide, on contrary to the description of the prior art, it has been found that the durability against the repeated cycles of coloration and discoloration is enhanced if no nickel oxide is contained in the intermediate layer. Consequently, in the present invention, the intermediate layer contains no nickel oxide or if any contains in an amount of less than 0.02, preferably less than 0.01, on the weight base relative to the main component making up said intermediate layer.

In the present invention, the solid electrolyte may comprise, for example, $Ta_2O_5$ as a main component. As the materials making up the intermediate layer, materials which are transparent (even in the case of metals, transparency can be obtained, if it is thin enough), and which have electric conductivity or characteristics of the solid electrolyte, can be used. Specifically, examples of the metals making up the intermediate layer include Ag, Au, Cr, Al, and Pd or a composite (a laminate of the metal oxide other than the nickel oxide and the metal, a mixture or such) of two or more thereof as a main component. Also, the metal oxide making up the intermediate layer may comprise any one of $SnO_2$, ZnO, $In_2O_3$, ITO, $Al_2O_3$, $SiO_2$, $TiO_2$, $Sb_2O_5$, and $ZrO_2$, or a composite of two or more thereof as a main component. Also, the oxidative coloration layer may comprise a nickel oxide as a main component. Further, the nickel oxide contained in the oxidative coloration layer may comprise NiO as a main component. Although, the thickness of the intermediate layer cannot be generalized because it depends upon the material, the lower limit is a thickness which can obtain an effect of suppressing characteristic deterioration due to repeated cycles of coloration and discoloration, while the upper limit is a thickness, which does not inhibit a transparency required for an intended application. In the case where the intermediate layer is an insulating material, the response change for the worse if the film becomes thicker, the upper limit of the thickness is a thickness which is sufficient for response required depending upon an intended application. For example, in the case of $SnO_2$, the thickness is desirably not more than 5 nm and less than 70 nm. If the thickness is less than 5 nm, the effect of suppressing characteristic deterioration due to repeated cycles of coloration and discoloration cannot be obtained in a sufficient manner. Conversely, if it exceeds 70 nm, the response gradually becomes slower at the time of discoloration.

DESCRIPTION OF PREFERRED EMBODIMENTS

First Embodiment

Figure 1:
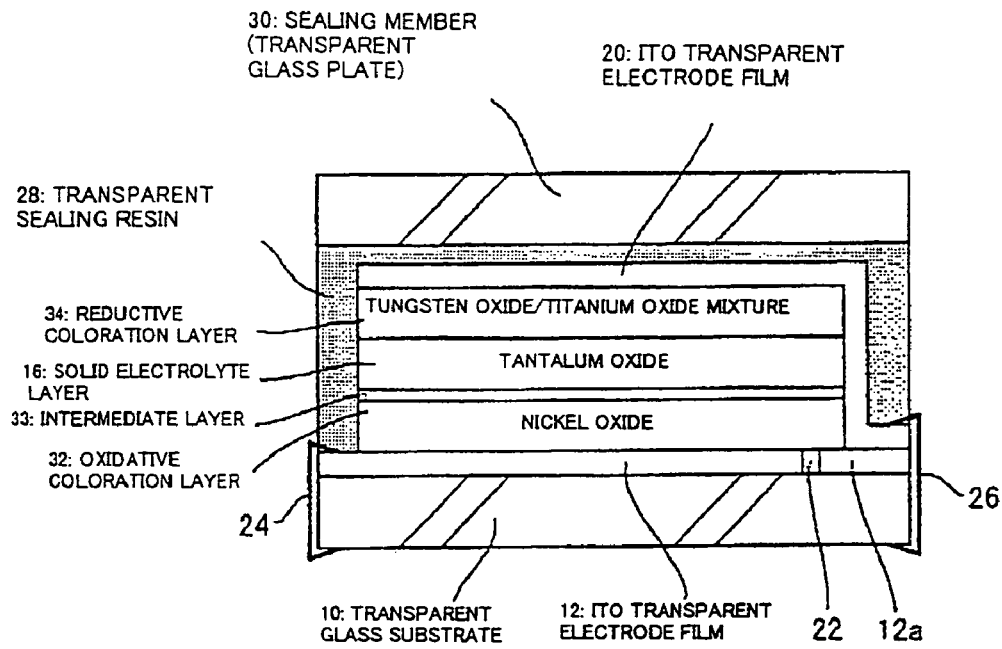
FIG. 1 is a drawing showing an embodiment of the present invention and is a schematic view showing a cross sectional configuration of the lamination of an EC element.
Figure 2:
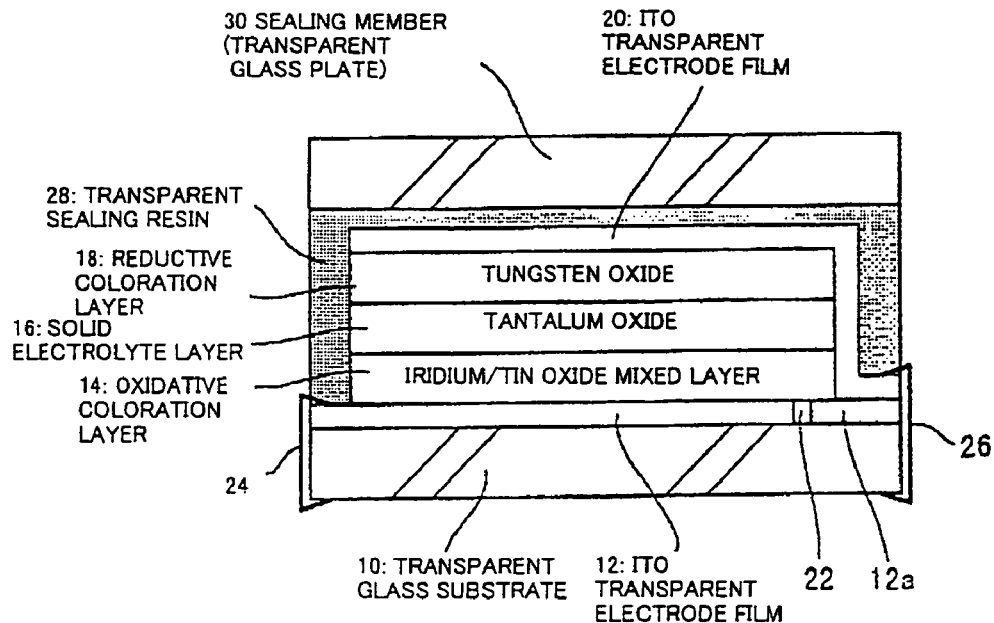
FIG. 2 is a schematic view showing a cross sectional configuration of the lamination of the conventional EC element.
Figure 3:
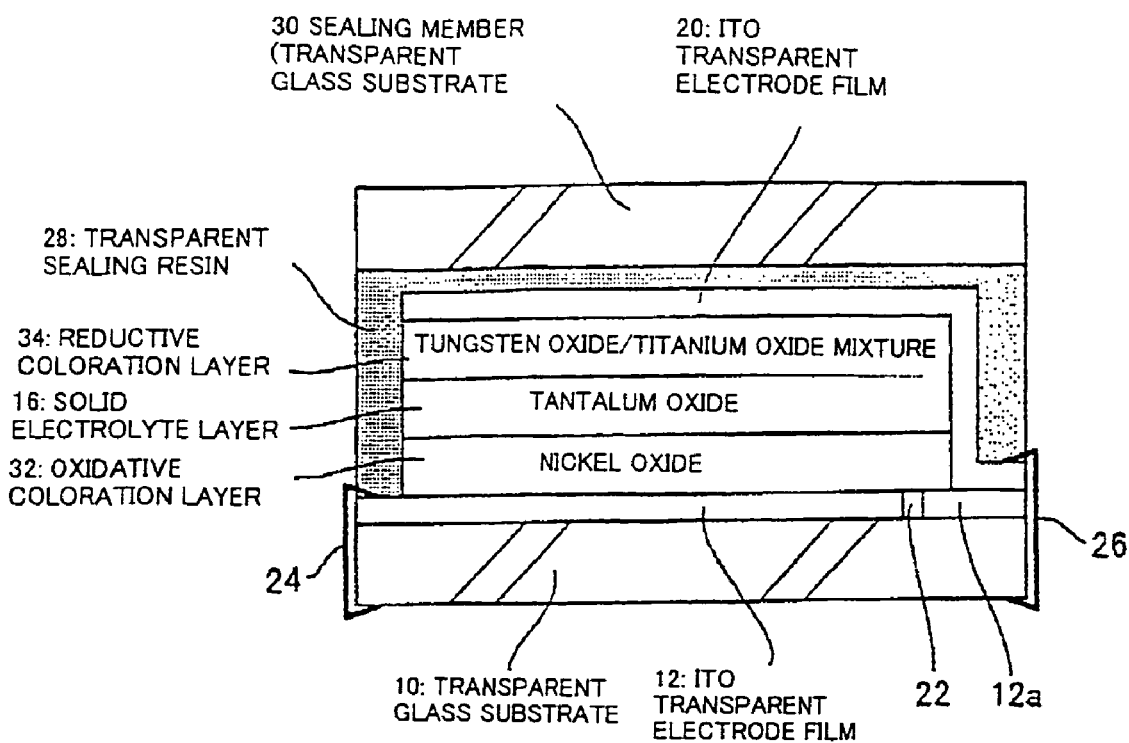
FIG. 3 is a schematic view showing a cross sectional configuration of the lamination of the EC element disclosed in Japanese Patent Application No. 2002-251856.

First embodiment of an EC element according to the present invention is shown in FIG. 1. This EC element is composed of the EC element of FIG. 3 described above having a gray color at the time of coloration having a device for measuring durability according to the present invention. The same portions as those of FIG. 3 are assigned to the same symbols. The matters which are not described hereinbellow are the matters which have already been described in the description of FIG. 3 and, thus, as for these matters, see the description of FIG. 3. In FIG. 1, an ITO transparent electrode film 12 making up a lower electrode film is formed on a transparent glass substrate 10, a nickel oxide film 32 making up an oxidative coloration layer, an intermediate layer 33, a tantalum oxide film 16 making up a solid electrolyte layer, a mixed film 34 comprising a tungsten oxide and a titanium oxide making up a reductive coloration layer, an ITO transparent electrode film 20 making up an upper electrode film are formed on this order.

The intermediate layer 33 is made up of a transparent film composed of a metal oxide other than nickel oxide or a metal or a composite comprising a metal oxide and a metal as a main component is placed between said oxidative coloration layer and said solid electrolyte layer. The intermediate layer 33 is desirably near colorless and transparent. Examples of the metal oxides making up the intermediate layer 33 include any one of $SnO_2$, $ZnO$, $In_2O_3$, ITO, $Al_2O_3$, $SiO_2$, $TiO_2$, $Sb_2O_5$, and $ZrO_2$, or a composite of two or more thereof as a main component. Although the metal oxide making up the intermediate layer 33 is desirably those which have electric conductivity such as $SnO_2$, insulating materials may also be used, since they do not inhibit any EC phenomenon if they are formed into a thin film. Examples of oxides making up the intermediate layer 33 include Ag, Au, Cr, Al, and Pd or a composite of two or more thereof as a main component. Also, as described fully later on, since durability against repeated cycles of coloration and discoloration is decreased if the intermediate layer 34 contains a nickel oxide which is an oxidative coloration material, the intermediate layer 34 no nickel oxide or if any contains in an amount of less than 0.02, preferably less than 0.01, on the weight base relative to the main component making up the intermediate layer 34.

A parting line 22 is previously formed on one edge of the lower ITO transparent electrode film 12 by a laser etching process, so that an area 12a of the edge portion is electrically partitioned. One edge of the upper ITO transparent electrode film 20 is electrically connected to the separated area 12a of the lower ITO transparent electrode film 12. Clip electrodes 24 and 26 for tapping an electrode are provided on both edge of the substrate 10. The clip electrode 24 is electrically connected to the lower ITO transparent electrode film 12, and the clip electrode 26 is electrically connected to the upper ITO transparent electrode film 20. A transparent liquid sealing resin 28 is applied onto the upper ITO transparent electrode film 20, whereon a transparent glass serving as a transparent sealing member 30 is cured to seal the whole of the laminated films. According to the configuration just mentioned, the EC layer shown in FIG. 1 is made transparent in the thickness direction thereof.

According to the configuration shown in FIG. 1, taking the clip electrode 24 as a positive pole and the clip electrode as negative pole and applying a voltage, both the oxidative coloration layer 32 and the reductive coloration layer 34 are colored. On the other hand, applying a reverse voltage (or making a shortage circuit), both coloration layers 32 and 34 are discolored. The chemical reactions at the time of the coloration and discoloration are, for example, represented by the following chemical formulae:

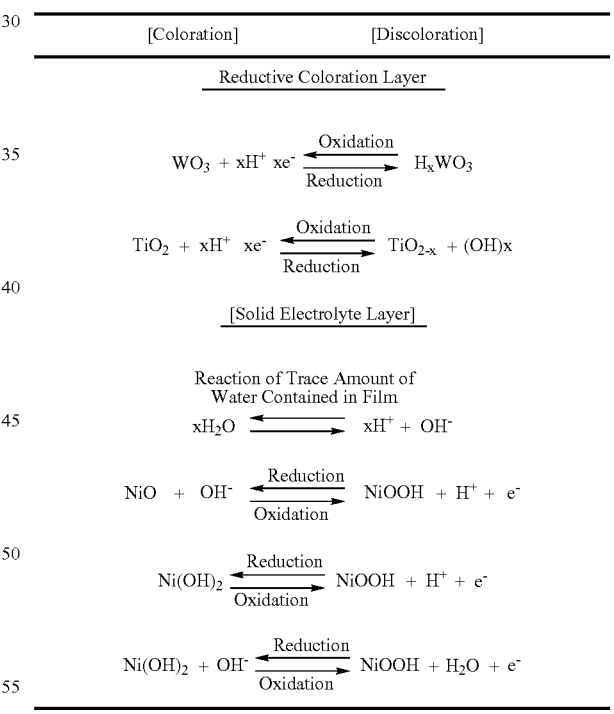

The productions stages for producing the EC element shown in FIG. 1 will be described as follows, where the intermediate layer 33 is here composed of an $SnO_2$ film:

(1) A transparent glass substrate 10 on which an ITO transparent electrode film 12 is formed is prepared, and it is cut into a desired shape. Alternatively, a transparent glass substrate 10 having being cut into a desired shape is prepared, and an ITO transparent electrode film 12 is formed thereon.

(2) A parting line 22 is formed by laser-etching the transparent glass substrate 10.

(3) The substrate 10 is accommodated within a vacuum chamber of a vacuum deposition apparatus, a nickel oxide film 32 is formed on the substrate 10 by a vacuum deposition process utilizing NiO or Ni as a depositing material (starting material) When Ni is used as the depositing material, the deposited Ni is compounded to oxygen within the vacuum chamber to form a nickel oxide.

(4) Subsequently, an $SnO_2$ film 33 is formed by a vacuum deposition process (precisely, an ion-plating process in which an electron beam deposition source is used and high frequency is applied) utilizing Sn a depositing material.

(5) Subsequently, a tantalum oxide film 16 is formed by a vacuum deposition process (precisely, an ion-plating process in which a high frequency is applied) utilizing $Ta_2O_5$ as a depositing material.

Figure 4:
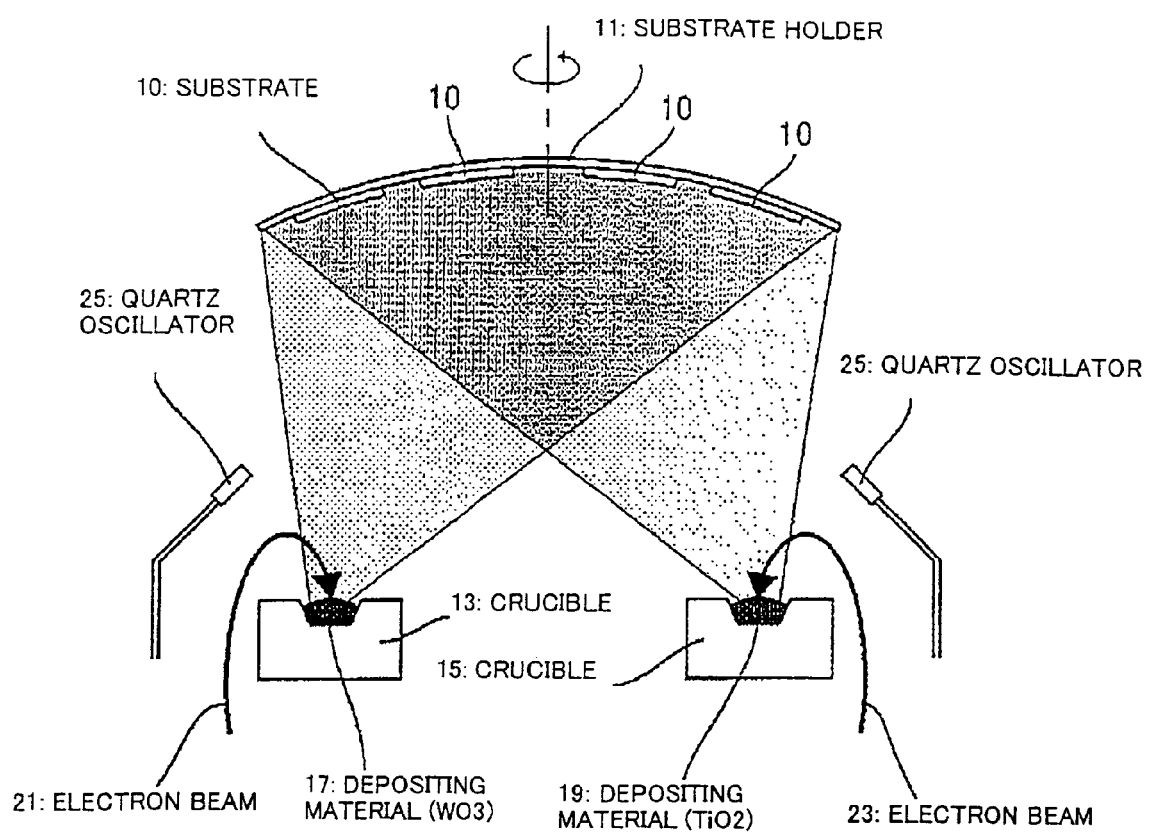
FIG. 4 is a schematic view showing the arrangement of elements within the vacuum deposition apparatus at the time of forming a mixed layer of a tungsten oxide and a titanium oxide by a two-element vacuum deposition.
Figure 5:
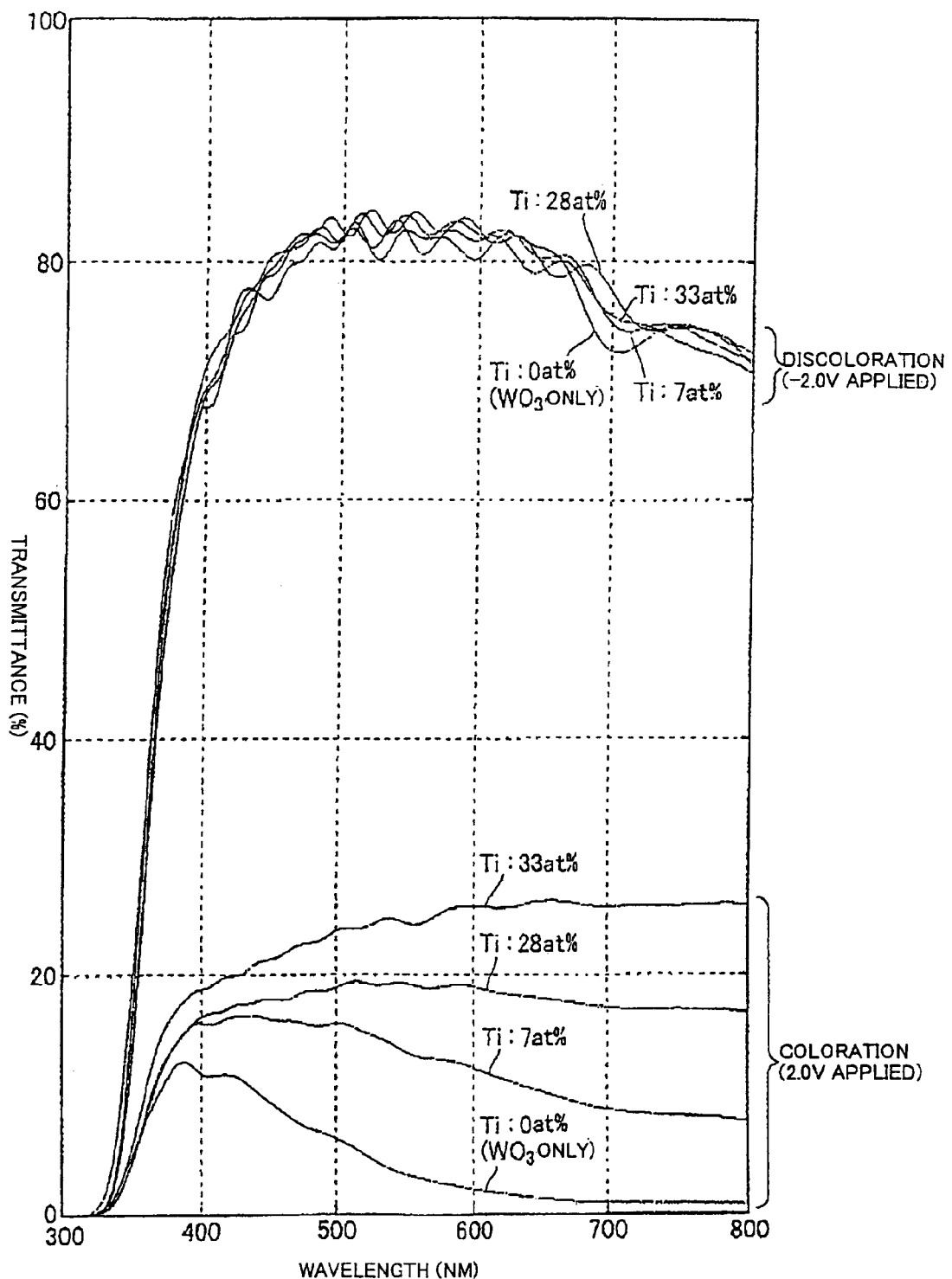
FIG. 5 shows spectral transmittance characteristics in the case where the mixing ratio of tungsten oxide and titanium oxide in the reductive coloration layer 34 in the EC element shown in FIG. 3 is varied.
Figure 6:
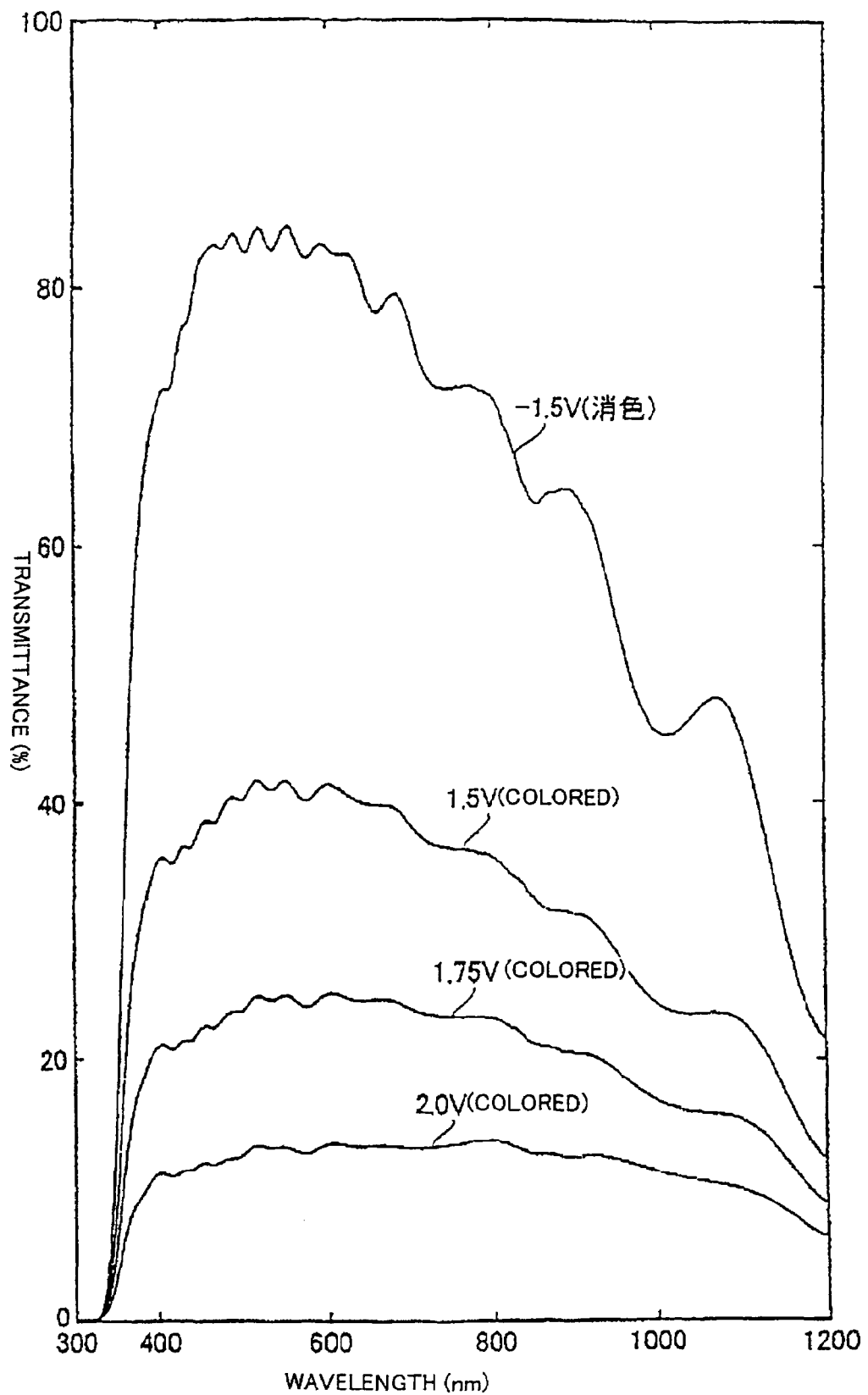
FIG. 6 shows spectral transmittance characteristics in the case where the coloration voltage is varied and the discoloration voltage is applied in the EC element shown in FIG. 3.
Figure 7:
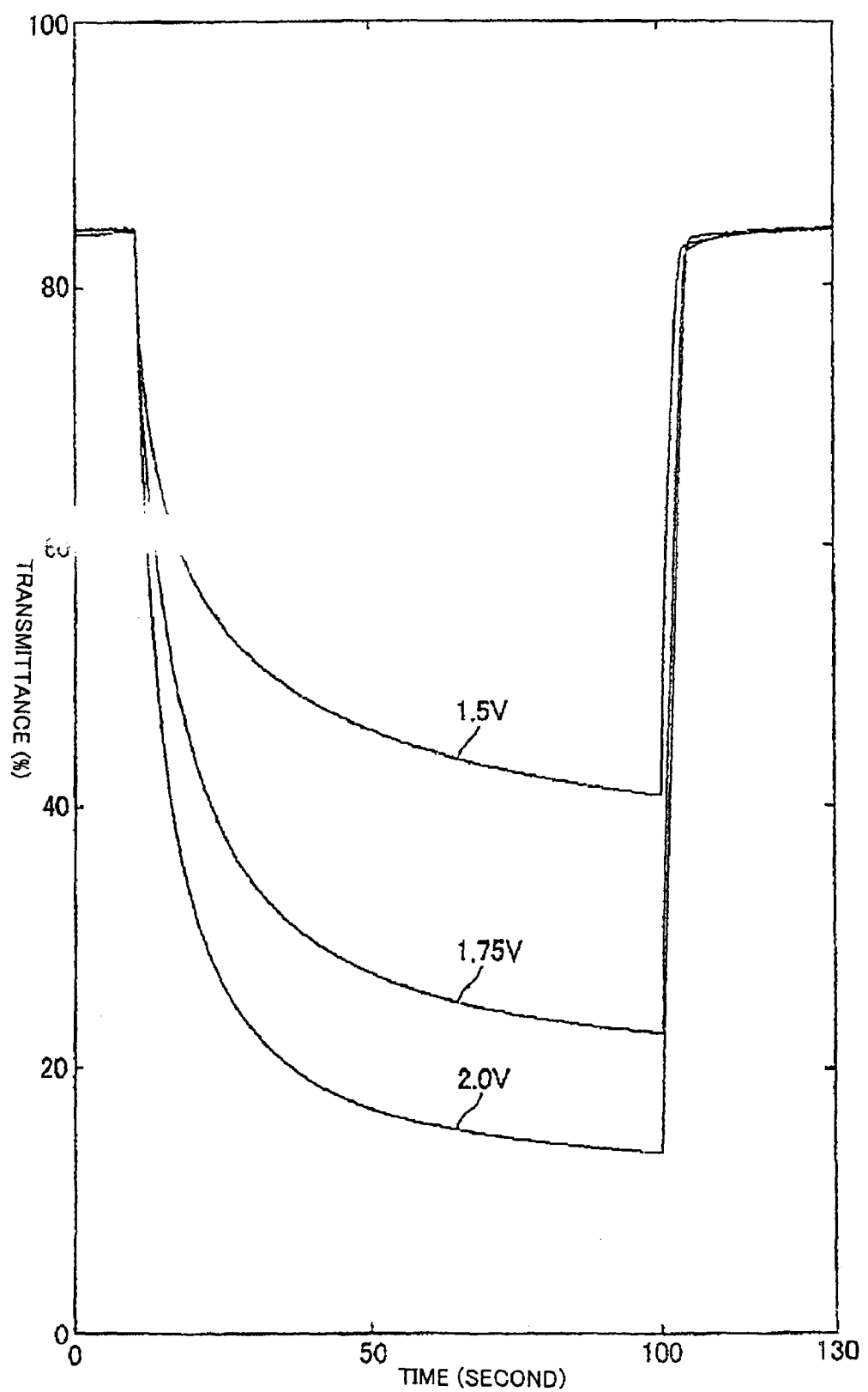
FIG. 7 shows characteristics for response speed at a time of the coloration in the case where the coloration voltage is varied in the EC element.
Figure 8:
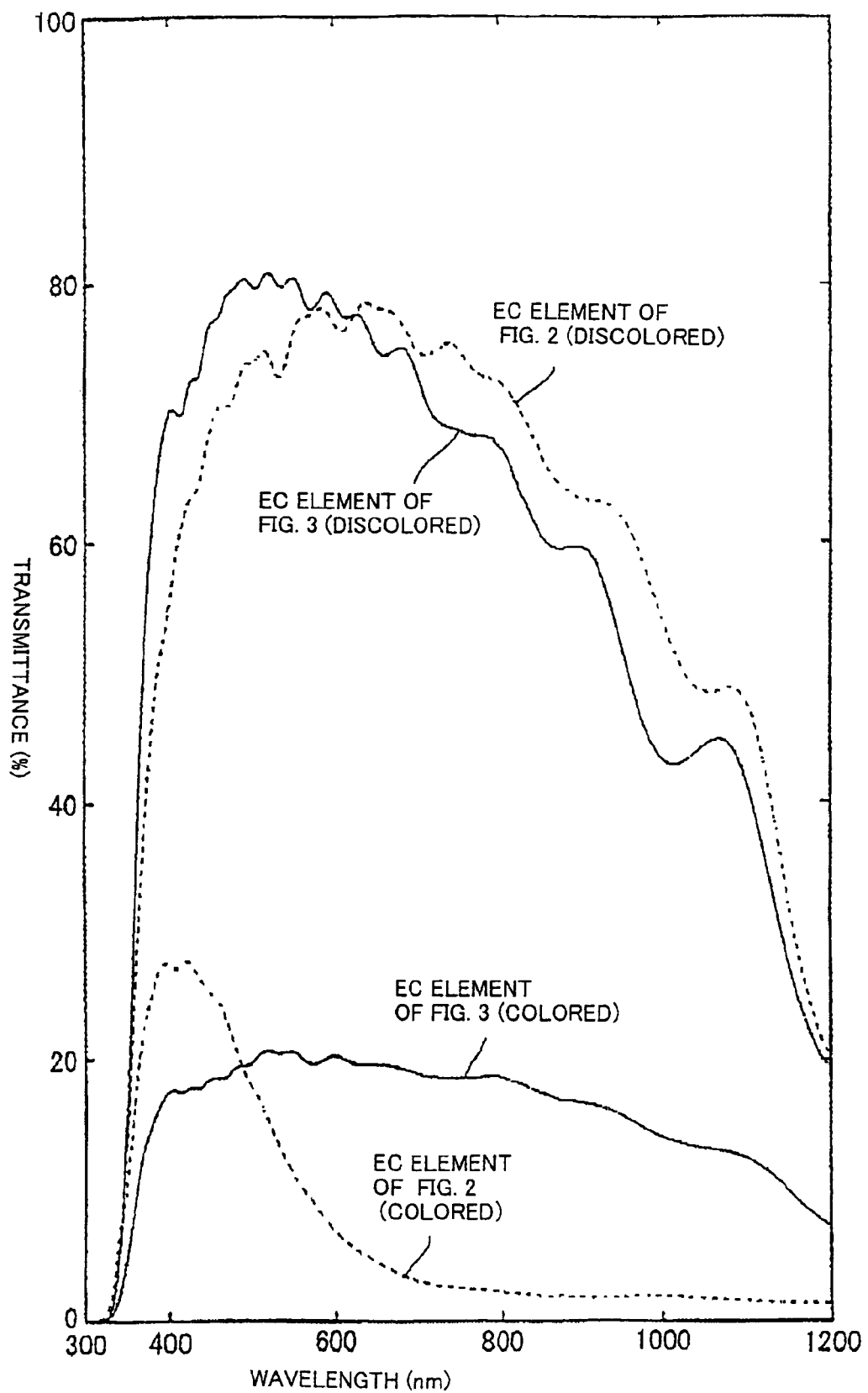
FIG. 8 shows differences between the EC element of FIG. 3 and the conventional EC element of FIG. 2 in spectral transmittance characteristics.
Figure 9:
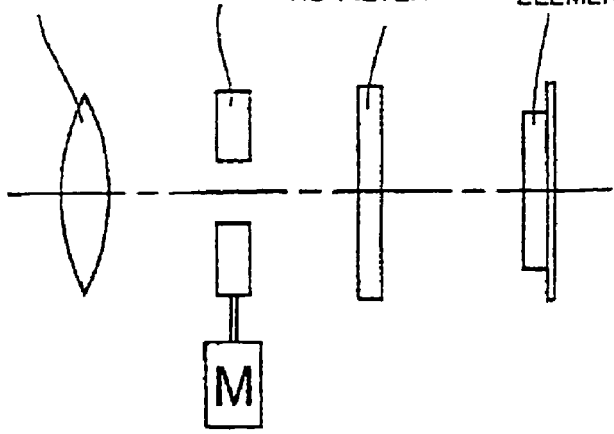
FIG. 9 schematically shows an example of the arrangement of main portions of an optic system in the case where the EC element of FIG. 3 is used in a digital camera.

(6) Subsequently, by a two-element vacuum deposition process utilizing $WO_3$ and $TiO_2$, respectively, a mixed film 34 comprising a tungsten oxide and a titanium oxide is formed. An example of the arrangement of elements within the vacuum deposition apparatus at the time of carrying out this two-element vacuum deposition is shown in FIG. 4. A plurality of substrates 10 onto which the tantalum oxide 16 is formed are held in the state each surface subjected to the film formation is faced downwardly on a lower surface of a rotating substrate holder 11. Crucibles 13 and 15 are provided under the substrate holder 11. $WO_3$ is accommodated within the crucible 13 as a depositing material 17. $TiO_2$ is accommodated within the crucible 15 as a depositing material 19. Electron beams 21 and 23 are applied to the depositing materials 17 and 19, respectively to heat and volatilize the depositing materials 17 and 19. The volatilized depositing materials 17 and 19 go upwardly, are mixed, and then deposited on the substrate 10 to thereby form the mixed film 34 comprising a tungsten oxide and a titanium oxide. In inclined upper directions of the crucibles 13 and 15, quartz oscillators 25, and 27 are placed respectively. By a change in the frequency of the quartz oscillator 25, the deposition rate of the depositing material 17 is monitored. By a change in the frequency of the quartz oscillator 27, the deposition rate of the depositing material 19 is monitored. By controlling the outputs of the electron beams 21 and 23 depending upon the deposition rates of the depositing materials 17 and 19, which are monitored, a mixing ratio of the tungsten oxide to the titanium oxide in the mixed film 34 in a predetermined value. The series of the film formation stages (3) to (6) can be continuously carried out by switching the deposition sources and film formation conditions step by step while holding the substrate 10 on the substrate holder 11 without taking the substrate 10 out of the chamber.

(7) For a time, the substrate 10 is taken out of the vacuum chamber, a mask pattern is changed, and then the substrate 10 is again accommodated within the vacuum chamber, after which an upper ITO transparent electrode film 20 is formed by a vacuum deposition process (precisely, an ion-plating process in which a high frequency is applied) utilizing ITO as a depositing material. Amongst the film production processes (3) to (7), the formation of the $SnO_2$ film 33 is carried out by an ion-plating process in which a high frequency of 400 W is applied in process (4), the formation of the tantalum oxide film 16 is carried out by an ion-plating process in which a high frequency of 600 W is applied in process (5), while the formation of the upper ITO transparent electrode film 20 is carried out by an ion-plating process in which a high frequency of 400 W is applied in process (7). The stages (3) and (6) are carried out without application of high frequency. It has been proven that the formation of the nickel oxide film 32 is carried out by an ion-plating process in which a high frequency is carried out, an originally colored nickel oxide film is formed (a colorless, transparent nickel oxide film can be formed).

(8) After the completion of film formation stages, the substrate 10 is taken out of the vacuum chamber, and clip electrodes 24 and 26 are provided.

(9) A transparent liquid sealing resin 28 is applied and a transparent glass as a sealing member 30 is adhered, and then the liquid sealing resin 28 is cured to complete the EC element.

In the production stages described above, a mixed film 34 comprising a tungsten oxide and a titanium oxide has been formed by a two-element vacuum deposition process utilizing $WO_3$ and $TiO_2$, respectively, a mixed film 34 comprising a tungsten oxide and a titanium oxide may be formed by preparing a mixed material of $WO_3$ and $TiO_2$, in a prescribed mixing ratio in advance, followed by sputtering utilizing the mixed material as a target material (starting material). Also, while the nickel oxide film 32 making up the oxidative coloration layer has been formed by a vacuum deposition process, it may be produced by a sputtering process utilizing NiO or Ni as a target material (starting material). When Ni is utilized as the target material, scattered Ni is mixed with oxygen within the vacuum chamber to form an nickel oxide.

Here, the effects due to the intermediate layer 33 in the EC element of FIG. 1 measured will be described. In the measurement, approximately 4 cm square sample (Present Sample A) is used. In Present Sample A, the thickness of ITO transparent electrode film 12 is approximately 250 nm, that of the nickel oxide film 32 is approximately 100 nm, that of $SnO_2$ film 33 is approximately 8 nm, that of tantalum oxide film 16 is approximately 600 nm, a mixed film 34 comprising a tungsten oxide and a titanium oxide is approximately 500 nm, and that of ITO transparent electrode film 12 is approximately 250 nm. Present Sample A is produced according to the production stages described above. The film formation conditions of the nickel oxide film 32, the $SnO_2$ film 33, the tantalum oxide film 16, a mixed film 34 comprising a tungsten oxide and a titanium oxide are as follows: The nickel oxide film 32 is formed by utilizing NiO having a purity of not less than 99.9% as a depositing material at a substrate temperature of 120° C. under an oxygen pressure of $3 \times 10^{-4}$ Torr at a film formation rate of 0.75 nm/second. The $SnO_2$ film 33 is formed by utilizing Sn having a purity of not less than 99.9% as a depositing material at a substrate temperature of 120° C. under an oxygen pressure of $3 \times 10^{-4}$ Torr at a film formation rate of 0.05 nm/second. The tantalum oxide film 16 is formed by utilizing $Ta_2O_5$ having a purity of not less than 99.9% as a depositing material at a substrate temperature of 120° C. under an oxygen pressure of $3 \times 10^{-4}$ Torr at a film formation rate of 0.67 nm/second. The mixed layer 34 comprising a tungsten oxide and a titanium oxide is formed by utilizing $WO_3$ and $TiO_2$ each having a purity of not less than 99.9% as depositing materials at a substrate temperature of 120° C. under an oxygen pressure of $1.6 \times 10^{-4}$ Torr. The atomic ratio of tungsten atom to titanium atom contained in the mixed film 34 comprising tungsten oxide and titanium oxide, W:Ti is set to be 72:28. In order to measure the effects by the intermediate layer 333, a sample of the EC element of FIG. 3 having no intermediate layer (Comparative Sample a) is produced according to the production stage described in FIG. 3. Comparative Sample a is the same as Present Sample A, except that it does not have any intermediate layer.

Figure 10:
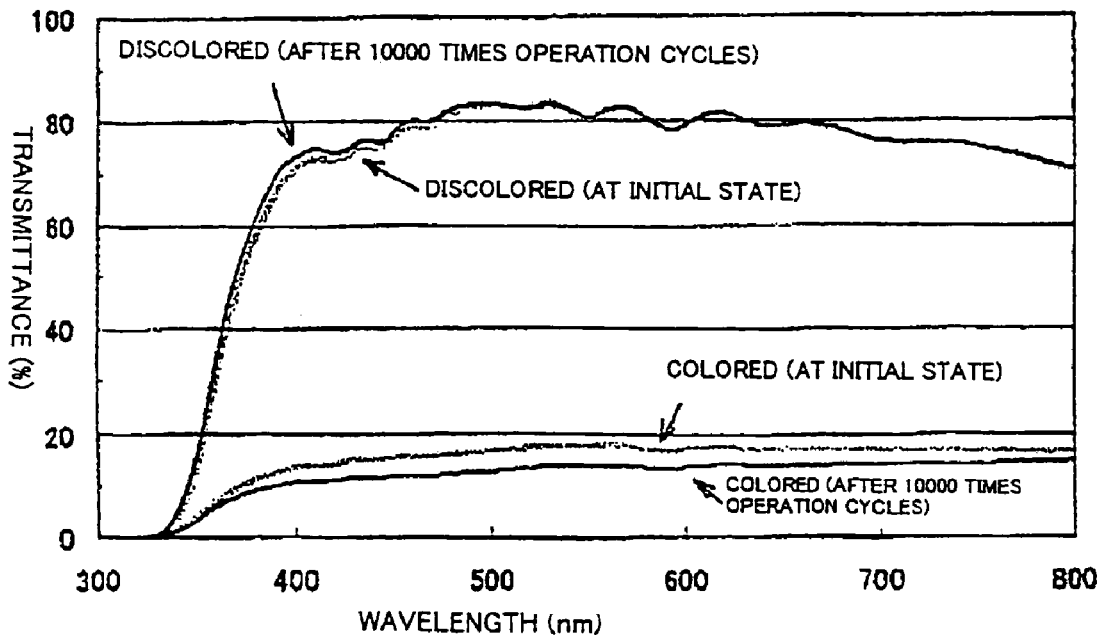
FIG. 10 shows spectral transmittance characteristics measured for the EC element of FIG. 1 where the intermediate layer is composed of $SnO_2$.
Figure 11:
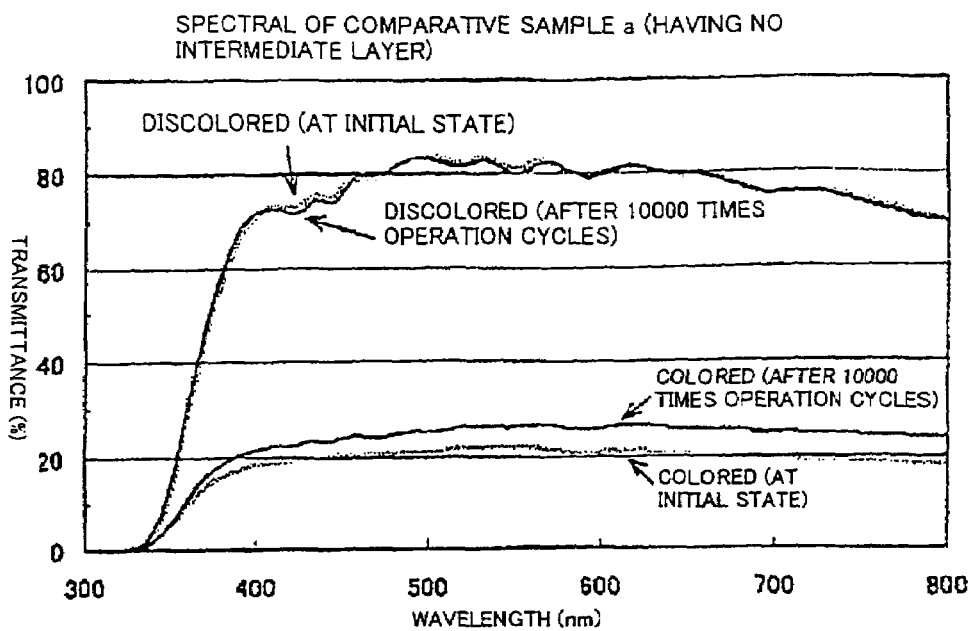
FIG. 11 shows spectral transmittance characteristics measured for a comparative EC element having no intermediate layer.

FIG. 10 shows spectral transmittance characteristics measured for Present Sample A, and FIG. 11 shows spectral transmittance characteristics measured for Comparative Sample a. In this measurement, the characteristics at an earlier stage after the production of sample (characteristics immediately before a test for repeating operation cycles ten thousand times) and the characteristics after a test for repeating operation cycles ten thousand times are measured for Samples A and a. Also, in this measurement, as for a transmittance at the time of coloration, a characteristic is measured after applying an applied voltage at +2.0V for 60 seconds. As for a transmittance at the time of discoloration, a characteristic is measured after applying a discoloration voltage at −2.0 V for 60 seconds. The operation conditions for the test for repeating operation cycles ten thousand times are that taking a series of operations that a driving in a coloration direction is carried out for 5 seconds by applying a voltage at +2.0V and then a driving in a discoloration direction is carried out for 5 seconds by applying a voltage at −2.0 V as one cycle, these operations are repeated 100,000 times. As can be understood from FIG. 10 and FIG. 11, substantially pure gray colors can be obtained at the time of coloration in both Samples A and a, and colorless, and substantially transparent transmitting colors can be obtained at the time of discoloration in both Samples A and a. According to FIG. 10 and FIG. 11, the transmittances at the time of coloration before the test for repeating operation cycles ten thousand times are not so different in Samples A and a (the transmittance in Present Sample A is somewhat lower). However, as for the transmittances after the test for repeating operation cycles ten thousand times, while the transmittance in Comparative Sample a is increased in comparison with the transmittance before the test for repeating operation cycles ten thousand times (the coloration becomes pale), the transmittance in Present Sample A is increased in comparison with the transmittance before the test for repeating operation cycles ten thousand times (the coloration becomes thick). No significant difference can be seen in the transmittance at the time of discoloration for both Samples A and a before and after the test for repeating operation cycles ten thousand times.

Figure 12:
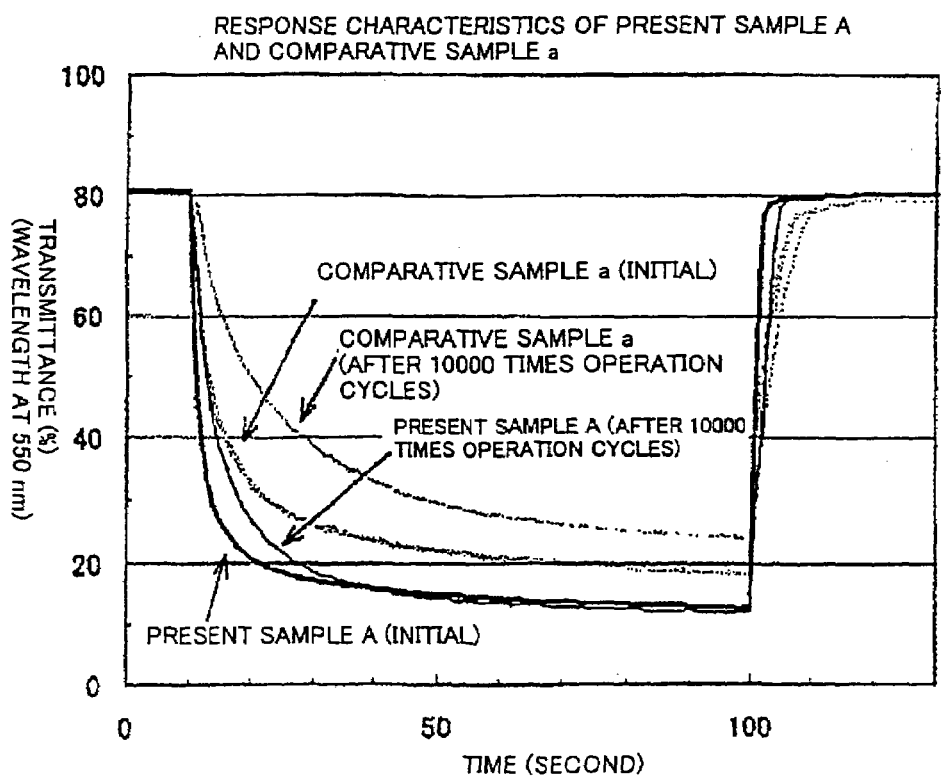
FIG. 12 shows characteristics of response rates measured for the EC element of FIG. 1 where the intermediate layer is composed of $SnO_2$ and for a comparative EC element having no intermediate layer.

FIG. 12 shows characteristics of response speeds measured for Samples A and a. In this measurement, as for Samples A and a before and after the test for repeating operation cycles ten thousand times, first a driving in a discoloration direction by applying a voltage at −2.0 V for 10 seconds, then a driving in a coloration direction by applying a voltage at +2.0V for 90 seconds, and a driving in a discoloration direction by applying a voltage at −2.0 V for 30 seconds are carried out, and the change in the transmittance at a wavelength of 550 nm during the course of the operation is measured. According to FIG. 12, it can be understood the response speeds of Present Sample A are faster than those of Comparative Sample in both before and after the test for repeating operation cycles ten thousand times. Although the response speeds are decreased after the test for repeating operation cycles ten thousand times, while the decreasing degree of Comparative Sample a at the time of driving in the coloration direction is very large, that of Present Sample A is suppressed to be a relatively low level. Consequently, it can be understood that according to Present Sample A, the presence of the intermediate layer 33 made of $SnO_3$ enhances the durability against repeated cycles of coloration and discoloration.

Analysis of the composition of the intermediate layer 33 for Present Sample A reveals that Ni:Sm is 2:98. Since the intermediate layer 33 is produced by utilizing Sn having a purity of 99.9% or more as a deposition material, Sn should be approximately 100%. However, it may be considered that some amounts of NiO formed at the first time is incorporated into the intermediate layer 33 by an influence in terns of the production stage. The atomic ratio of Ni:Sn, which is =2:98, can be converted into a weight ratio of $NiO/SnO_2$, which is 0.01. The conversion into the weight ratio is based on the assumption that all of Ni atoms form NiO and all of Sn atoms form $SnO_2$.

In order to examine the influence of the incorporation of NiO into the intermediate layer 22, a sample (Comparative Sample b) in which an amount of NiO incorporated in the intermediate layer 33 is increased in comparison with that of Present Sample A is produced, and the following test is carried out. The weight ratio of NiO to $SnO_2$, $NiO/SnO_2$, in Comparative Sample b is 0.14. Similar to the test for operating ten thousand times, utilizing Present Sample A and Comparative Sample b, operations where driving in a coloration direction is carried out by applying a voltage at +2.0 V for 15 seconds, a driving in a discoloration direction is carried out by applying a voltage at −2.0 V for 5 seconds are repeated. As a result, the color of Comparative Sample b is changed in blown after the repeating number of 60 times, and it could not be returned to the transparent state. On the other hand, no problem occurred in Present Sample A.

From the results described above, the followings can be said. According to Japanese Patent Laid-Open No 9-152634 "the weight ratio of the oxidative coloring electrochromic substance to the metal oxide (the oxidative coloring electrochromic substance/the metal oxide) is preferably not more than 0.02 and not less than 0.02. It is disclosed that if the weight ratio is greater than 1, absorbency is unduly large, whereas the weight ratio is less than 0.02, a coloring rate becomes slow and durability is change for the worse." In the case are the oxidative coloration layer is composed of a material containing a nickel oxide, on contrary to the description of the prior art, it has been found that the durability against the repeated cycles of coloration and discoloration is enhanced if no nickel oxide is contained in the intermediate layer. Consequently, in the present invention, the intermediate layer contains no nickel oxide or if any contains in an amount of less than 0.02, preferably less than 0.01, on the weight base relative to the main component making up said intermediate layer. It can be said that in the case are the oxidative coloration layer 33 is composed of a material containing a nickel oxide, on contrary to the description of the prior art, the intermediate layer 33 contains no nickel oxide or if any contains in an amount of less than 0.02, preferably less than 0.01, on the weight base relative to the main component making up said intermediate layer 33.

It is noted that since the $SnO_2$ film 33 in Present Sample A is very thin, it is difficult to analyze the crystalline construction thereof. For this reason, Present Sample A could not confirm the crystalline construction whether it is crystalline or amorphous. However, it can be deduced that there is no problem in terms of performance irrelative to the crystalline construction whether it is crystalline or amorphous.

Figure 13:
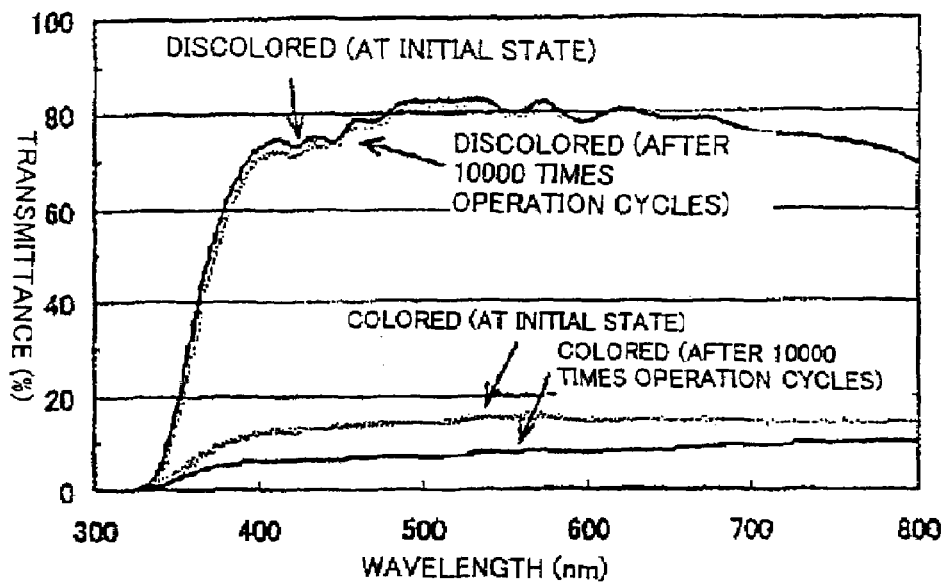
FIG. 13 shows spectral transmittance characteristics measured for the EC element of FIG. 1 where the intermediate layer is composed of Al.

FIG. 13 spectral transmittance characteristics measured in a manner similar to that of FIG. 10 for a sample (Present Sample B) produced by changing the intermediate layer 33 from $SnO_2$ to Al in Present Sample A. The Al film 33 in Present Sample B is formed by utilizing Al having a purity of not less than 99.9% as a depositing material at a substrate temperature of 120° C. under an oxygen pressure of not more than $1 \times 10^{-4}$ Torr at a film formation rate of 5 nm/second to be a thickness of 20 nm (in the case of $SnO_2$ film, since the film is formed by reacting Sn with an oxygen gas, the film formation rate is slow, but in the case of the Al film, the film formation rate may be quick since the film is formed without introduction of oxygen, i.e., without reaction with oxygen). The film formation processes except for the Al film 33 are the same as those described for the processes for producing Present Sample A. As can be seen from FIG. 13, a substantially pure gray color can be obtained at the time of coloration and a colorless, and substantially transparent transmitting color can be obtained at the time of discoloration. The transmittance at the time of coloration after the test for operating ten thousand times is significantly decreased in comparison with that before the test for operating ten thousand times (the coloration becomes thick). No significant difference can be seen in the transmittance at the time of discoloration for both Samples B and a before and after the test for operating ten thousand times.

Figure 14:
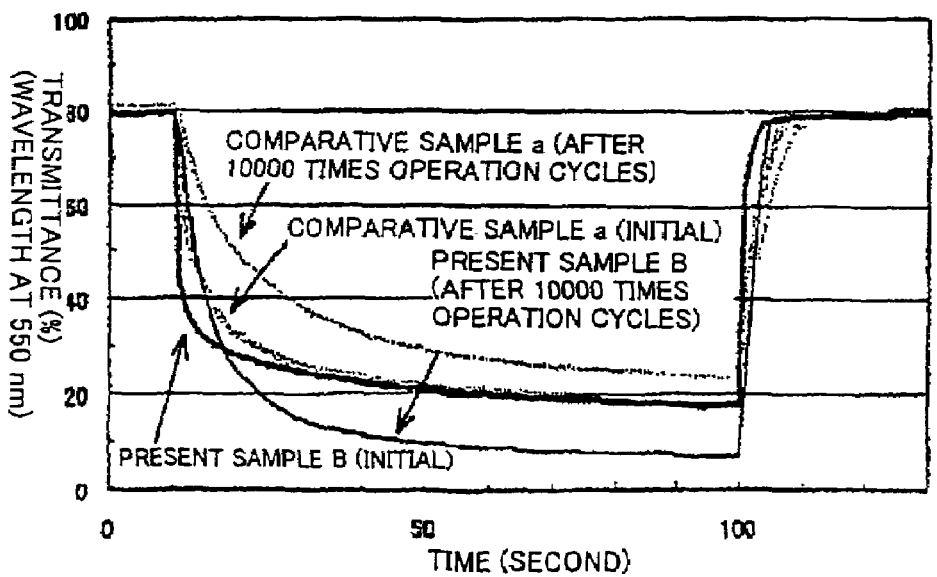
FIG. 14 shows characteristics of response rates measured for the EC element of FIG. 1 where the intermediate layer is composed of Al and for a comparative EC element having no intermediate layer.

FIG. 14 shows characteristics of response speeds measured for Present Sample B and the above-mentioned Comparative Sample a similar to the case of FIG. 12. According to FIG. 14, it can be understood the response speeds of Present Sample B are faster than those of Comparative Sample in both before and after the test for operating ten thousand times. Although the response speeds are decreased after the test for operating ten thousand times in both Samples B and a, while the decreasing degree of Comparative Sample a at the time of driving in the coloration direction is very large, that of Present Sample B is suppressed to be a relatively low level. Consequently, it can be understood that according to Present Sample B, the presence of the intermediate layer 33 made of Al enhances the durability against repeated cycles of coloration and discoloration.

Figure 15:
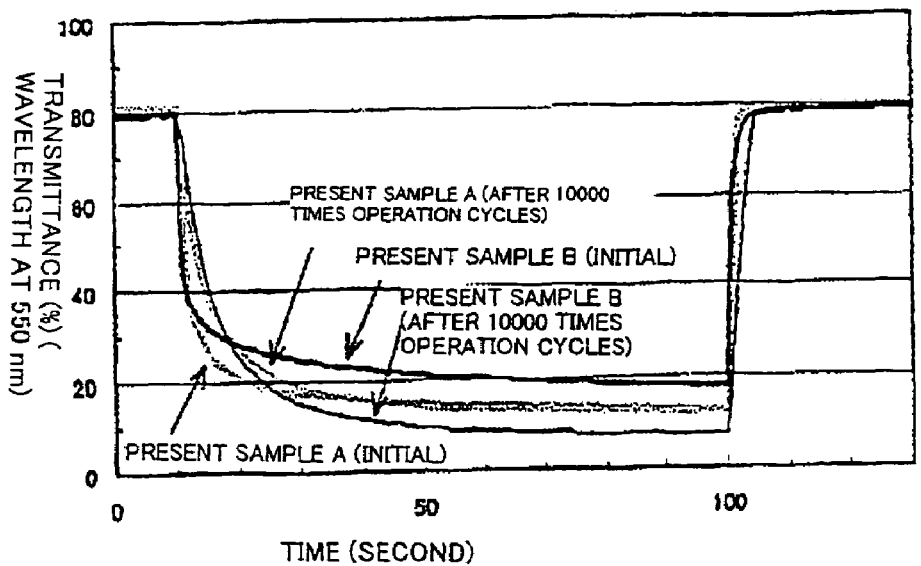
FIG. 15 shows characteristics of response rates measured for the EC element of FIG. 1 where the intermediate layer is composed of $SnO_2$ overlapped with characteristics of response rates measured for the EC element of FIG. 1 where the intermediate layer is composed of Al.

FIG. 15 shows characteristics of response speeds measured for Present Sample A (intermediate layer 33: SnO$_2$) shown in FIG. 12 overlapped with characteristics of response speeds measured for Present Sample A (intermediate layer 33: Al) shown in FIG. 14. According to this figure, it can be understood that although as for the characteristics before the test for operating ten thousand times (initial characteristics), those of Present Sample A are superior to those of Present Sample B, as for characteristics after the test for operating ten thousand times, a contrast ratio of Present Sample B (the color is thicken) is superior to that of Present Sample A.

In the EC element of FIG. 1, the intermediate layer 33 may be composed of a metal oxide other than a nickel oxide or a metal or a composite (a laminate of the metal oxide other than the nickel oxide and the metal, a mixture of the metal oxide other than the nickel oxide with the metal or such).

Other embodiments of the present invention will be described. The intermediate layer 33 may be composed similar to those described in the first embodiment.

Second Embodiment

Figure 16:
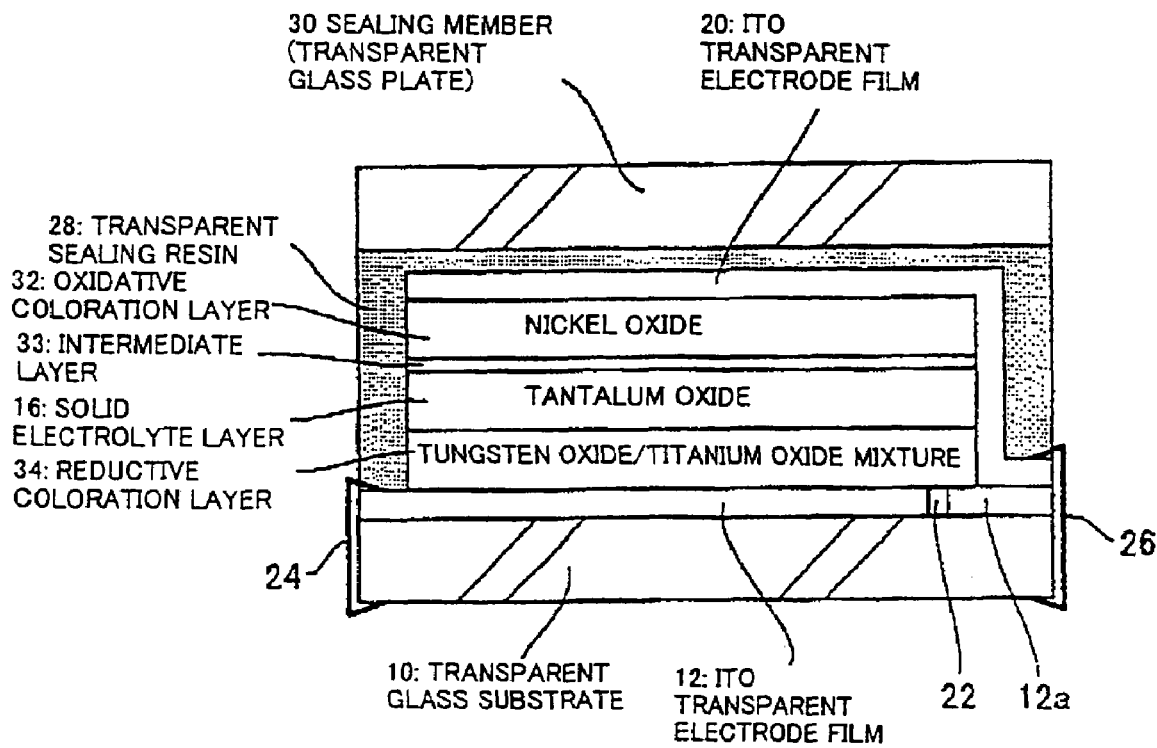
FIG. 16 is a drawing showing a second embodiment of the present invention and is a schematic view showing a cross sectional configuration of the lamination of an EC element.

FIG. 16 is a drawing showing a second embodiment of the present invention. This embodiment is an EC element in the embodiment shown in FIG. 1 where the arrangement of the nickel oxide film 32 making up the oxidative coloration layer and the mixed film 34 comprising a tungsten oxide and a titanium oxide making up the reductive coloration layer are altered. Parts common to those of the embodiment of FIG. 1 are assigned to the same symbols.

Third Embodiment

Figure 17:
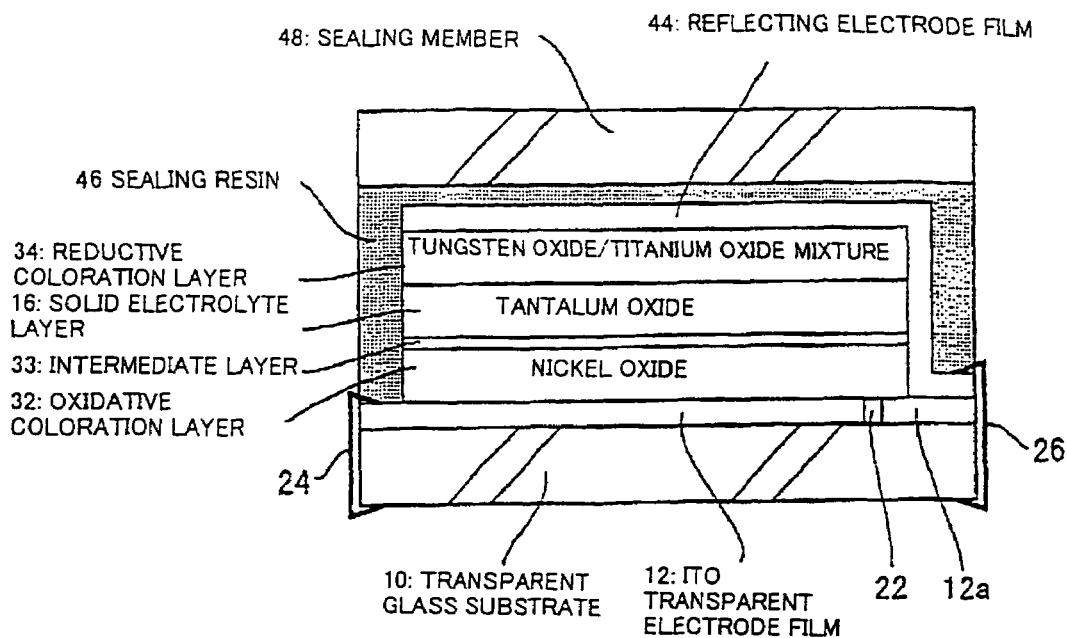
FIG. 17 is a drawing showing a third embodiment of the present invention and is a schematic view showing a cross sectional configuration of the lamination of an EC element.

FIG. 17 is a drawing showing a third embodiment of the present invention. In this embodiment, an anti-glare mirror for an automobile or such is configured whose surface side is at the substrate side. Parts common to those of the embodiment of FIG. 1 are assigned to the same symbols. An ITO transparent electrode film 12 making up a lower electrode film is formed on a transparent glass substrate 10, a nickel oxide film 32 making up an oxidative coloration layer, an intermediate layer 33, a tantalum oxide film 16 making up a solid electrolyte layer, a mixed film 34 comprising tungsten oxide and titanium oxide making up a reductive coloration layer, a reflecting electrode film 44 made of Al, Ni, Cr, or such making up an upper electrode film are formed on this order. A parting line 22 is previously formed on one edge of the lower ITO transparent electrode film 12 by a laser etching process, so that an area 12a of the edge portion is electrically partitioned. One edge of the upper reflecting film 44 also serving as an electrode is electrically connected to the separated area 12a of the lower ITO transparent electrode film 12. Clip electrodes 24 and 26 for tapping an electrode are provided on both edge of the substrate 10. The clip electrode 24 is electrically connected to the lower ITO transparent electrode film 12, and the clip electrode 26 is electrically connected to the upper reflecting film 44 also serving as an electrode. A liquid sealing resin 46 is applied onto the upper reflecting film 44 also serving as an electrode, whereon a plate-form member such as a glass plate, a resin plate, or a metal plate as a sealing member 48 is adhered and the sealing resin 46 is cured to seal the whole of the laminated films. According to the configuration just mentioned, the EC layer shown in FIG. 17 makes up an antiglare mirror having a gray color and a low reflectance at the time of coloration, and having a colorless and a high reflectance whose surface side is at the side of the transparent glass 10

Forth Embodiment

Figure 18:
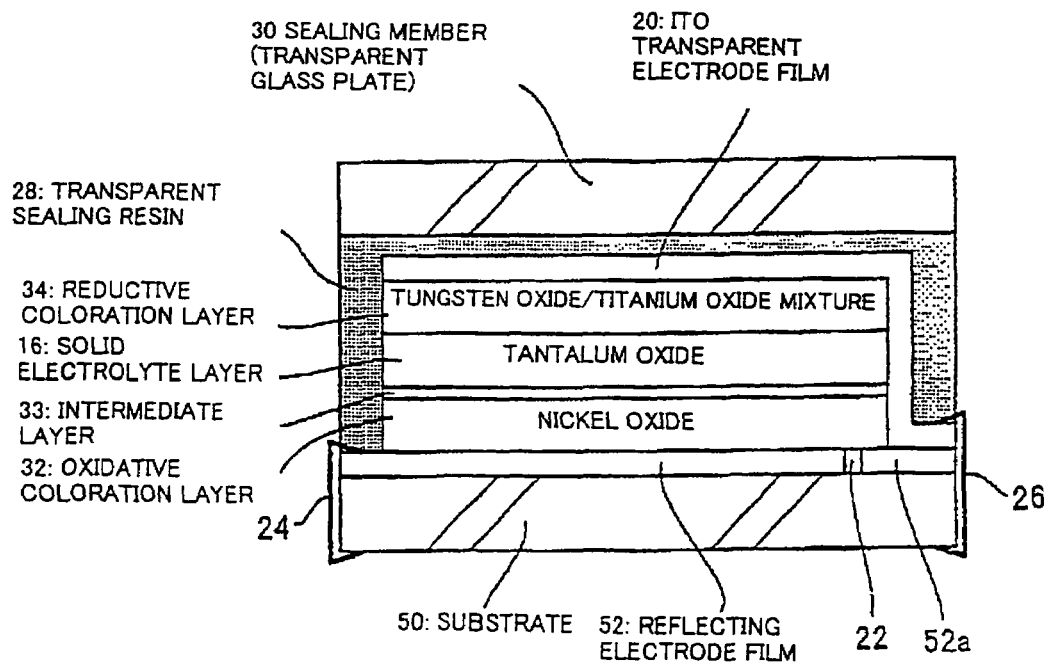
FIG. 18 is a drawing showing a fourth embodiment of the present invention and is a schematic view showing a cross sectional configuration of the lamination of an EC element.

FIG. 18 is a drawing showing a forth embodiment of the present invention. In this embodiment, an anti-glare mirror for an automobile or such is configured whose surface side is at the sealing member side. Parts common to those of the embodiments of FIG. 1 and FIG. 17 are assigned to the same symbols. A reflecting electrode film 52 making up a lower reflecting film also serving as an electrode is formed on a substrate 50 such as a glass, on which a nickel oxide film 32 making up an oxidative coloration layer, an intermediate layer 33, a tantalum oxide film 16 making up a solid electrolyte layer, a mixed film 34 comprising a tungsten oxide and a titanium oxide making up a reductive coloration layer, an ITO transparent electrode film 20 making up an upper electrode film are formed on this order. As the reflecting electrode film 52, a metal material, which is not corroded during the course of the lamination stage for laminating upper layers, is preferably used. A parting line 22 is previously formed on one edge of the reflecting electrode film 52 12 by a laser etching process, so that an area 52a of the edge portion is electrically partitioned. One edge of the upper ITO transparent electrode film 20 is electrically connected to the separated area 52a of the reflecting electrode film 52. Clip electrodes 24 and 26 for tapping an electrode are provided on both edge of the substrate 50. The clip electrode 24 is electrically connected to the reflecting electrode film 52, and the clip electrode 26 is electrically connected to the upper ITO transparent electrode film 20. A transparent liquid sealing resin 28 is applied onto the upper ITO transparent electrode film 20, whereon a transparent glass serving as a transparent sealing member 30 is applied and the liquid sealing resin 28 is cured to seal the whole of the laminated films. According to the configuration just mentioned, the EC layer shown in FIG. 18 makes up an antiglare mirror having a gray color and a low reflectance at the time of coloration, and having a colorless and a high reflectance whose surface side is at the side of the transparent sealing resin 28

Fifth Embodiment

Figure 19:
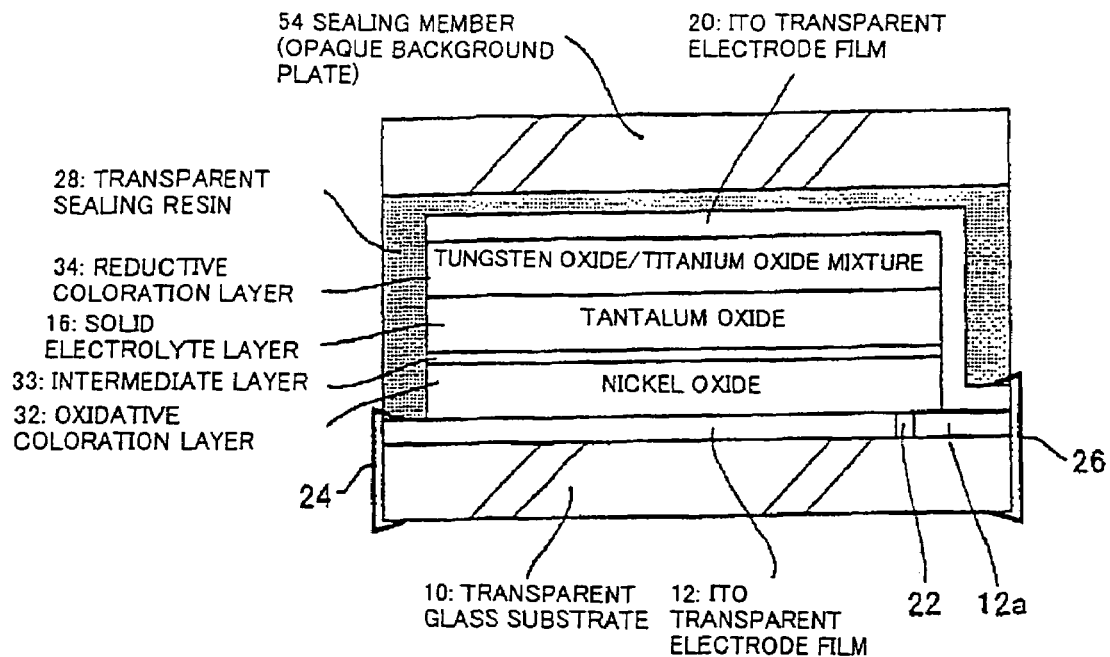
FIG. 19 is a drawing showing a fifth embodiment of the present invention and is a schematic view showing a cross sectional configuration of the lamination of an EC element.

FIG. 19 is a drawing showing a fifth embodiment of the present invention. In this embodiment, a display element whose surface side is at the substrate side is configured. Parts common to those of the embodiment of FIG. 1 are assigned to the same symbols. An ITO transparent electrode film 12 making up a lower electrode film is formed on a transparent glass substrate 10, a nickel oxide film 32 making up an oxidative coloration layer, an intermediate layer 33, a tantalum oxide film 16 making up a solid electrolyte layer, a mixed film 34 comprising a tungsten oxide and a titanium oxide making up a reductive coloration layer, and an upper ITO transparent electrode film 20 are formed on this order. A parting line 22 is previously formed on one edge of the lower ITO transparent electrode film 12 by a laser etching process, so that an area 12a of the edge portion is electrically partitioned. One edge of the upper reflecting film 44 also serving as an electrode is electrically connected to the separated area 12a of the lower ITO transparent electrode film 12. Clip electrodes 24 and 26 for tapping an electrode are provided on both edge of the substrate 10. The clip electrode 24 is electrically connected to the lower ITO transparent electrode film 12, and the clip electrode 26 is electrically connected to the upper ITO transparent electrode film 20. The upper and lower transparent electrode films 12 and 20 are patterned so as to display desired letter(s), symbol(s), picture(s) and the like. A transparent liquid sealing resin 28 is applied onto the upper ITO transparent electrode film 20, on which an opaque background plate such as a white glass plate is adhered, and the liquid sealing resin is cured to seal the whole of the laminated films. According to the configuration just mentioned, the EC layer shown in FIG. 19 makes up a display element whose surface side is at the substrate side. In this case, the displayed color is gray, which is of a less sense of incongruity in comparison with the case of the conventional display element which has a blue hue or such. Also, when a dial or a display element for watch or such in a segment manner or a dot matrix manner is configured, since the discolored portion becomes colorless and substantially transparent, the display can easily be recognized.

Sixth Embodiment

Figure 20:
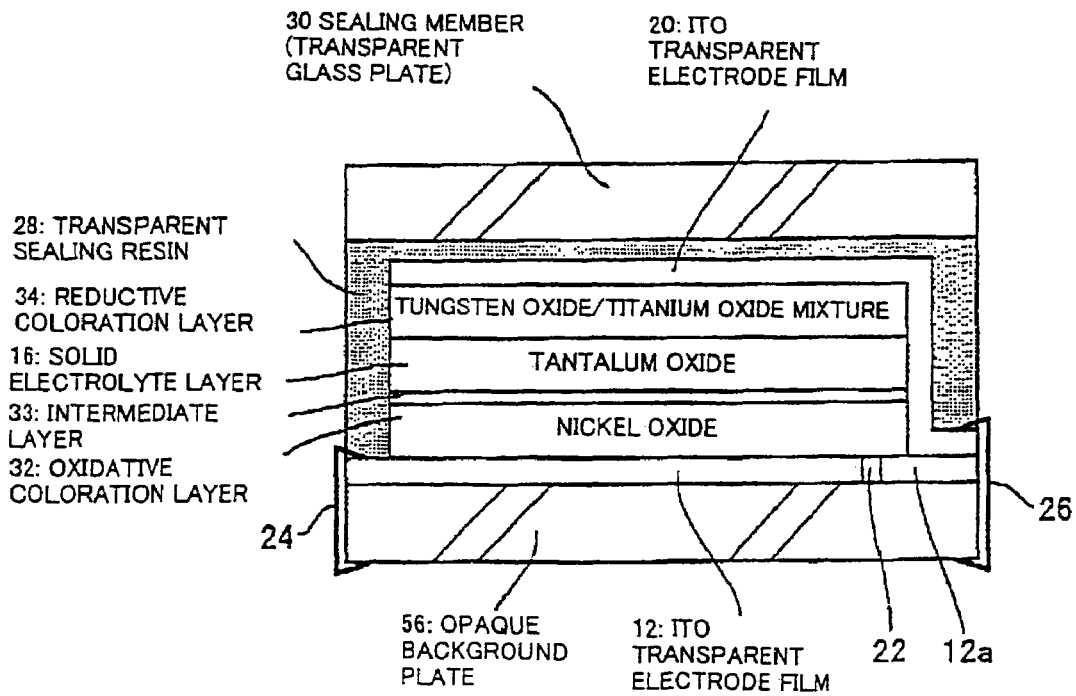
FIG. 20 is a drawing showing a sixth embodiment of the present invention and is a schematic view showing a cross sectional configuration of the lamination of an EC element.

FIG. 20 is a drawing showing a sixth embodiment of the present invention. In this embodiment, a display element is configured whose surface side is at the sealing member side. Parts common to those of the embodiments of FIG. 1 and FIG. 19 are assigned to the same symbols. An ITO transparent electrode film 12 making up a lower electrode is formed on an opaque substrate 56 such as a white glass, on which a nickel oxide film 32 making up an oxidative coloration layer, an intermediate layer 33, a tantalum oxide film 16 making up a solid electrolyte layer, a mixed film 34 comprising a tungsten oxide and a titanium oxide making up a reductive coloration layer, and an ITO transparent electrode film 20 making up an upper electrode film are formed on this order. A parting line 22 is previously formed on one edge of the lower ITO transparent electrode film 12 by a laser etching process, so that an area 12a of the edge portion is electrically partitioned. One edge of the upper ITO transparent electrode film 20 is electrically connected to the separated area 12a of the lower ITO transparent electrode film 12. Clip electrodes 24 and 26 for tapping an electrode are provided on both edge of the substrate 56. The clip electrode 24 is electrically connected to the lower ITO transparent electrode film 12, and the clip electrode 26 is electrically connected to the upper ITO transparent electrode film 20. The upper and lower transparent electrode films 12 and 20 are patterned so as to display desired letter(s), symbol(s), picture(s) and the like. A transparent liquid sealing resin 28 is applied onto the upper ITO transparent electrode film 20, on which a transparent glass plate as a sealing member 30 is adhered, and the liquid sealing resin 28 is cured to seal the whole of the laminated films. According to the configuration just mentioned, the EC layer shown in FIG. 20 makes up a display element whose surface side is at the side of the sealing member 30. In this case, the displayed color is gray, which is of a less sense of incongruity in comparison with the case of the conventional display element which has a blue hue or such. Also, when a dial or a display element for watch or such in a segment manner or a dot matrix manner is configured, since the discolored portion becomes colorless and substantially transparent, the display can easily be recognized.

In the foregoing third to sixth embodiments, the arrangement of the nickel oxide film 32 making up the oxidative coloration layer and the mixed film 34 comprising a tungsten oxide and a titanium oxide making up the reductive coloration layer are altered. Also, whereas the solid electrolyte film 16 is composed of $Ta_2O_5$, any other inorganic electrolyte materials (such as $SiO_2$, $MgF_2$, $Sb_2O_5$, and $ZrO_2$) may also be used as the material for making up the solid electrolyte film 16.

Seventh Embodiment

Figure 21:
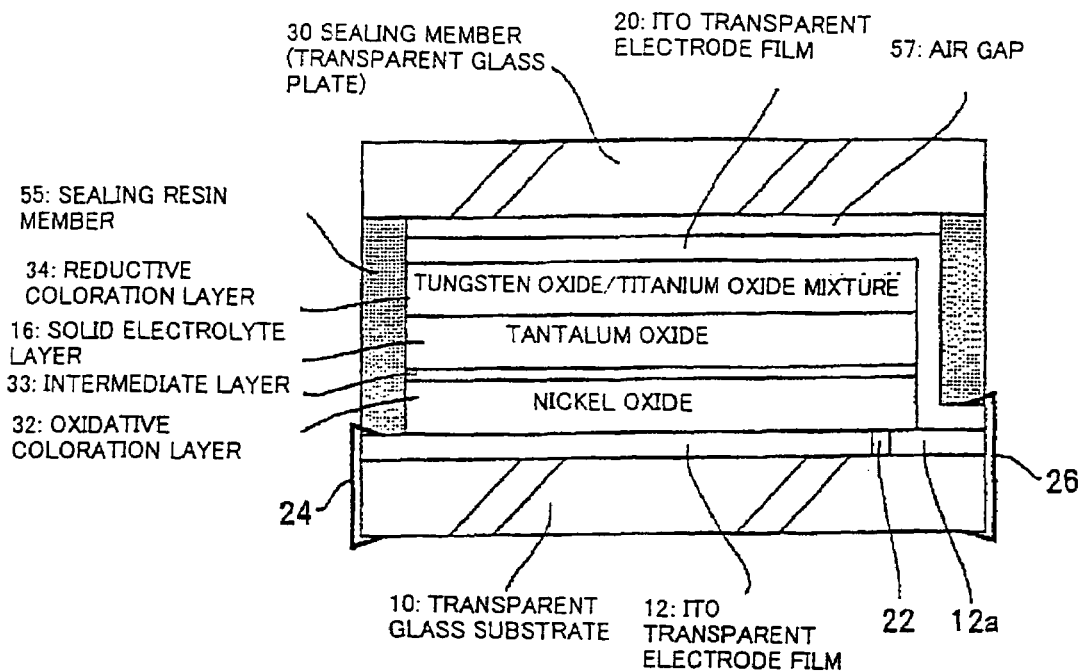
FIG. 21 is a drawing showing a seventh embodiment of the present invention and is a schematic view showing a cross sectional configuration of the lamination of an EC element.

FIG. 21 shows a seventh embodiment of the present invention. In this embodiment, a solid sealing material is used instead of the liquid sealing resin in the configuration of FIG. 1. On a transparent glass substrate 10 provided on a laminated film composed of an lower ITO transparent electrode film 12, an oxidative coloration layer 32, an intermediate layer 33, a solid electrolyte layer, and a reductive coloration layer 34, and an upper ITO transparent electrode 20 has been formed, and then a ring sealing resin member 55 as a solid sealing member surrounds the circumference of the laminated film thus produced, a lower surface of the ring sealing resin member 55 is adhered on the transparent glass substrate 10, and an upper surface thereof is adhered onto the sealing member 30 whereby the total of the EC element is unified. It is also possible to form an air gap (air layer) 57 between the upper ITO transparent electrode film 20 and the sealing member 30.

Eighth Embodiment

Figure 22:
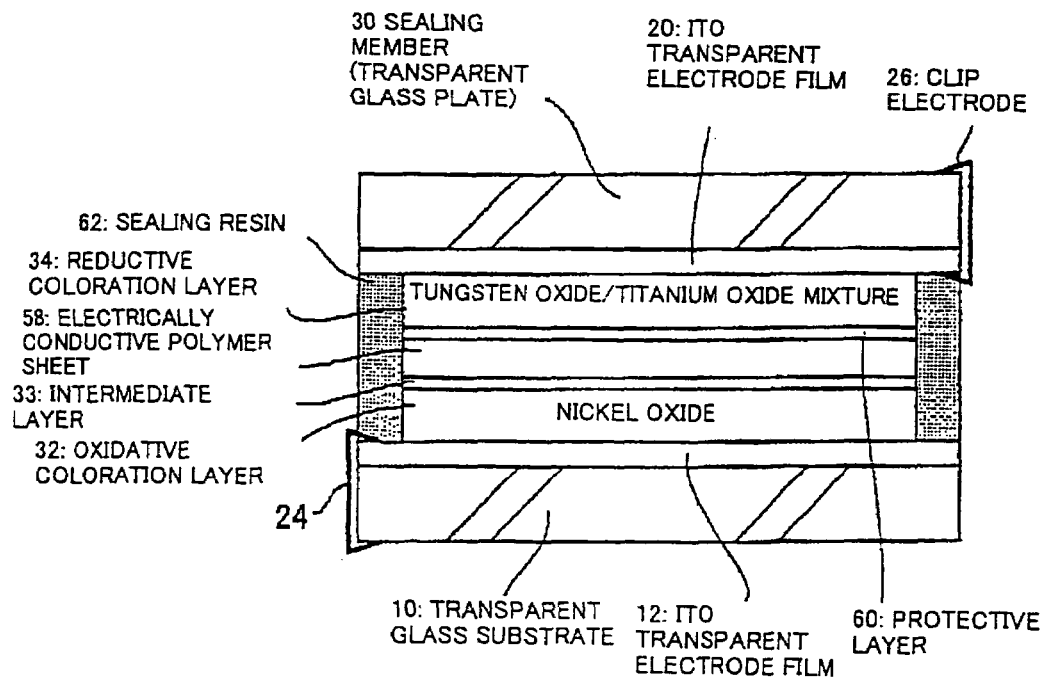
FIG. 22 is a drawing showing a eighth embodiment of the present invention and is a schematic view showing a cross sectional configuration of the lamination of an EC element.

FIG. 22 shows an eighth embodiment of the present invention. In this embodiment, in the configuration of FIG. 1, the solid electrolyte layer 16 is changed from the inorganic solid electrolyte material to a macromolecular solid electrolyte material (electrically conductive polymer sheet). Parts common to those of the embodiment of FIG. 1 are assigned to the same symbols. The EC element in this embodiment is composed so that between upper and lower ITO transparent electrode film 20 and 12, an oxidative coloration layer 32 composed of a nickel oxide, an intermediate layer 33, an electrically conductive polymer sheet 58, a protective layer 60, and a reductive coloration layer 34 composed of a mixture of a tungsten oxide and a titanium oxide are laminated. The protective layer 60 is for protecting the mixed film comprising a tungsten oxide and a titanium oxide making up the reductive coloration layer. A sealing resin 62 is applied and cured on all the external circumference of a laminate comprising the oxidative coloration layer 32, the intermediate layer 33, the electrically conductive polymer sheet 58, the protective layer 60, and the reductive coloration layer 34 to seal the whole of the laminate. A clip electrode 26 electrically connected to the upper ITO transparent electrode 20 is provided on the side of the sealing member 30.

Figure 23:
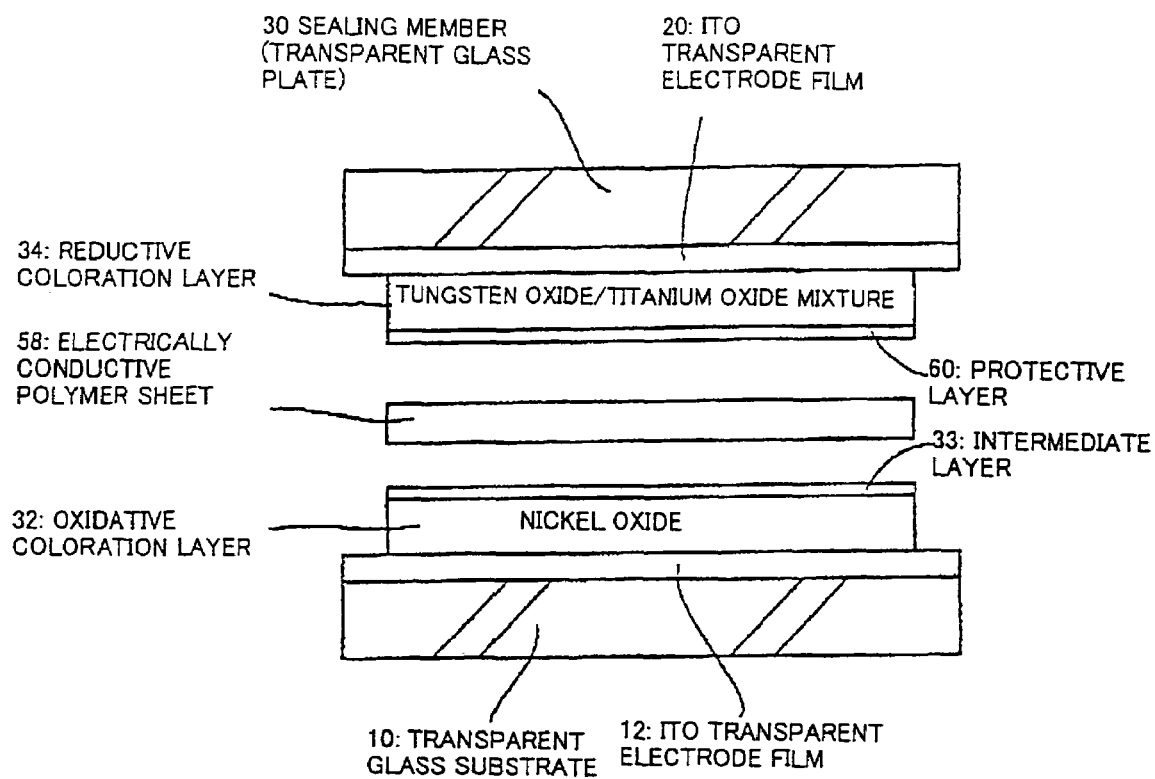
FIG. 23 schematically shows a process for producing the EC element according to the eight embodiment.

Referring to FIG. 23, one example of the production stages will be described.

(1) Two transparent glass substrates each having a prescribed shape and each having an ITO transparent electrode film formed thereon are prepared as a transparent glass substrate 10 having a lower ITO transparent electrode film 12 provided thereon and a sealing member 30 having an upper lower ITO transparent electrode film 20 provided thereon, respectively.

(2) The substrate 10 is accommodated within a vacuum chamber of a vacuum deposition apparatus, a nickel oxide film 32 is formed on the substrate 10 by a vacuum deposition process utilizing NiO or Ni as a depositing material (starting material).

(3) Subsequently, an $SnO_2$ film 33 is formed by a vacuum deposition process (precisely, an ion-plating process in which an electron beam deposition source is used and high frequency is applied) utilizing Sn a depositing material.

(4) The substrate 10 is taken out of the vacuum deposition apparatus, then the sealing member 30 is accommodated within the vacuum deposition apparatus, according to a two-element vacuum deposition process utilizing $WO_3$ and $TiO_2$, respectively, a mixed film 34 comprising tungsten oxide and titanium oxide is formed on the sealing member 30.

(5) Subsequently, for example, a $Ta_2O_5$ film is formed on the surface of the mixed film 34 comprising tungsten oxide and titanium oxide as the protective layer for the mixed film 34.

(6) The sealing member 30 is taken out of the vacuum deposition apparatus, and clip electrodes 24 and 26 are provided on the substrate 10 and the sealing member 30, respectively.

(7) The laminated surfaces of the substrate 10 and the sealing member 30 are placed in face-to-face manner, an electrically conductive polymer sheet 58 is sandwiched between them, and they are brought into closely contacted with each other.

(8) A liquid sealing resin is applied onto all the external circumference of the resulting laminate, and cured to seal the laminate, whereby the total of the EC layer is unified to be ready for use.

In the foregoing embodiments, the oxidative coloration layer only composed of the nickel oxide has been described, the present invention is not restricted thereto. The oxidative coloration layer may contain a nickel oxide as a main component, and the oxidative coloration layer may also be composed of a nickel oxide to which other substance or substance is/are added. Also, the present invention does not prevent the existence of a transition region where a mixed area of the oxidative coloration material and the intermediate layer material exists between the oxidative coloration layer and the intermediate layer, or an existence of a transition area where a mixed area of the intermediate layer material and the solid electrolyte material exists between the intermediate layer and the solid electrolyte layer.

What is claimed is:

1. An electrochromic element having a configuration that a reductive coloration layer and an oxidative coloration layer are arranged in a facing manner between which a solid electrolyte layer is intervened;

wherein said reductive coloration layer comprises a material containing a tungsten oxide and a titanium oxide;
   wherein said oxidative coloration layer comprises a material containing a nickel oxide;
   wherein a transparent intermediate layer comprising at least one of a metal oxide other than a nickel oxide and a metal as a main component is placed between said oxidative coloration layer and said solid electrolyte layer, and
   wherein said electrochromic element has a gray color at the time of coloration.

2. The electrochromic element according to claim 1, wherein said reductive coloration layer is a film of a mixture comprising a tungsten oxide and a titanium oxide as main component or a film of a mixture comprising a tungsten oxide as a main component with a titanium oxide added thereto, and said oxidative coloration layer is a film comprising a nickel oxide as a main component.

3. The electrochromic element according to claim 1, wherein atomic number of tungsten contained in said reductive coloration layer is larger than atomic number of titanium.

4. The electrochromic element according to claim 1, wherein the proportion of titanium atom in said reductive coloration layer relative to the total atomic number of tungsten atoms and titanium atoms is from 5 to 40%.

5. The electrochromic element according to claim 4, wherein the proportion of titanium atom in said reductive coloration layer relative to the total atomic number of tungsten atoms and titanium atoms is from 20 to 30%.

6. The electrochromic element according to claim 1, wherein said tungsten oxide comprises $WO_3$ as a main component, said titanium dioxide comprises $TiO_2$ as a main component, and said nickel oxide comprises NiO as a main component.

7. The electrochromic element according to claim 1, wherein said nickel oxide contains $Ni(OH)_2$.

8. The electrochromic element according to claim 1, wherein said reductive coloration layer is amorphous, and said oxidative coloration layer is crystalline, fine-crystalline or amorphous.

9. The electrochromic element according to claim 1, wherein said reductive coloration layer has the reaction represented by formulae:

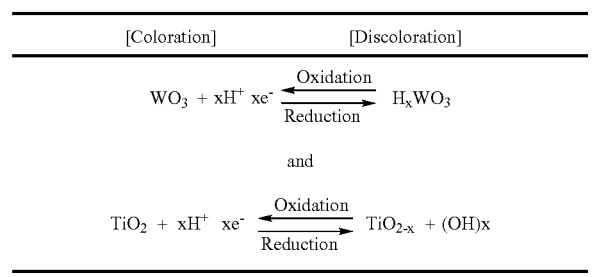

and said oxidative coloration layer has the reaction represented by formulae:

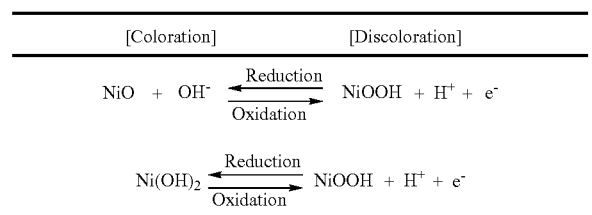

-continued

| [Coloration] | | [Discoloration] |
|---|---|---| or $$Ni(OH)_2 + OH^- \underset{\text{Oxidation}}{\overset{\text{Reduction}}{\rightleftarrows}} NiOOH + H_2O + e^-.$$

10. The electrochromic element according to claim 1, wherein said reductive coloration layer contains components of a film formed by a two-element deposition process utilizing $WO_3$ and $TiO_2$ as starting materials, and said oxidative coloration layer contains components of a film formed by a deposition process utilizing NiO as a starting material.

11. The electrochromic element according to claim 1, wherein the peak value at a time of coloration is not less than 1.75 V, and not more than 3 V when both electrodes comprises transparent electrode films, and not less than 1V and not more than 1.8 V, when one electrode comprises a transparent electrode film and the other electrode comprises a reflecting film also serving as an electrode.

12. The electrochromic element according to claim 11, wherein the peak value at a time of coloration is not less than 2 V.

13. The electrochromic element according to claim 1, which is colorless at the time of discoloration.

14. The electrochromic element according to claim 1, wherein said metal oxide making up said intermediate layer comprises any one of $SnO_2$, ZnO, $In_2O_3$, ITO, $Al_2O_3$, $SiO_2$, $TiO_2$, $Sb_2O_5$, and $ZrO_2$, or a composite of two or more thereof as the main component.

15. The electrochromic element according to claim 1, wherein said metal oxide making up said intermediate layer comprises an electrically conductive metal oxide.

16. The electrochromic element according to claim 1, wherein said metal making up said intermediate layer comprises any one of Ag, Au, Cr, Al, and Pd or a composite of two or more thereof as the main component.

17. An electrochromic element comprising a first electrode layer, a reductive coloration layer, a solid electrolyte layer, an oxidative coloration layer, and a second electrode layer laminated between two plate materials, and at least combination of a plate material at one side with the electrode layer of said two plate materials and said two electrode layers being made transparent;

wherein said reductive coloration layer is composed of a material containing a tungsten oxide and a titanium oxide;

wherein said oxidative coloration layer is composed of a material containing a nickel oxide;

wherein a transparent intermediate layer composed of a metal oxide other than a nickel oxide or a metal or a composite comprising a metal oxide other than the nickel oxide and a metal as a main component is placed between said oxidative coloration layer and said solid electrolyte layer, and wherein said electrochromic element has a gray color at the time of coloration.

18. The electrochromic element according to claim 17, wherein both of said two plate materials and said two electrode layers are made transparent, the total of said element is made transparent in the thickness direction thereof; and said electrochromic element is placed on an optical axis of an imaging element of a digital camera as an element for adjusting exposure.

19. The electrochromic element according to claim 17, wherein one combination of a plate material at one side with the electrode layer of said two plate materials and said two electrode layers is made transparent, and the electrode layer at the other side is made of a reflecting metal film to make up a reflectance-variable mirror.

20. An electrochromic element having
a substrate,
a first electrode layer formed on said substrate in a fixed manner,
an oxidative or reductive coloration layer formed on said first electrode layer in a fixed manner,
a solid electrolyte layer formed on said oxidative or reductive coloration layer in a fixed manner,
a reductive or oxidative coloration layer formed on said solid electrolyte layer in a fixed manner, and
a second electrode layer formed on said reductive or oxidative coloration layer in a fixed manner, at least one of said first and second electrode layers being made transparent,
wherein said reductive coloration layer is composed of a material containing a tungsten oxide and a titanium oxide;
wherein said oxidative coloration layer is composed of a material containing a nickel oxide;
wherein a transparent intermediate layer composed of a metal oxide other than a nickel oxide or a metal or a composite comprising a metal oxide and a metal as a main component is placed between said oxidative coloration layer and said solid electrolyte layer, and
wherein said electrochromic element has a gray color at the time of coloration.

21. The electrochromic element according to claim 20, wherein said substrate is made transparent, said first and second electrode layer are each composed of a transparent electrode film, a transparent plate-form sealing member is conjugated with said second electrode layer via a transparent sealing resin, the total of the element is made transparent in the thickness direction thereof, and the element is placed on an optical axis of an imaging element of a digital camera as an element for adjusting exposure.

22. The electrochromic element according to claim 20, wherein said substrate is made transparent, said first electrode layer is composed of a transparent electrode film, said second electrode layer is composed of a reflecting metal film, and a sealing member is conjugated with said second electrode layer via a sealing resin to make up a reflectance-variable mirror whose front side is at the side of said substrate.

23. An electrochromic element comprising a transparent intermediate layer composed of a metal oxide other than a nickel oxide or a metal or a composite comprising a metal oxide other than the nickel oxide and a metal as a main component is placed between an oxidative coloration layer containing a nickel oxide and a solid electrolyte layer.

24. The electrochromic element according to claim 23, wherein said metal making up said intermediate layer comprises any one of Ag, Au, Cr, Al, and Pd or a composite of two or more thereof as the main component.

25. The electrochromic element according to claim 23, wherein said metal oxide making up said intermediate layer comprises one of $SnO_2$, ZnO, $In_2O_3$, ITO, $Al_2O_3$, $SiO_2$, $TiO_2$, $Sb_2O_5$, and $ZrO_2$, and a composite of two or more thereof as the main component.

26. The electrochromic element according to claim 23, wherein said metal oxide making up said intermediate layer comprises an electrically conductive metal oxide.

27. The electrochromic element according to claim 23, wherein said oxidative coloration layer comprises a nickel oxide as a main component.

28. The electrochromic element according to claim 23, wherein said nickel oxide contained in said oxidative coloration layer comprises NiO as a main component.

* * * * *